US012730692B2

(12) United States Patent
Daugherty et al.

(10) Patent No.: US 12,730,692 B2

(45) Date of Patent: Sep. 8, 2026

(54) DISTRIBUTED AND PERSISTED USER NOTIFICATIONS

(71) Applicant: DELL PRODUCTS L.P., Round Rock, TX (US)

(72) Inventors: Daniel Thomas Daugherty, Plano, TX (US); Nagesh Ram Mohan Maddala, Bengaluru (IN); Michael D. Luczak, Katy, TX (US)

(73) Assignee: Dell Products L.P., Round Rock, TX (US)

( * ) Notice: Subject to any disclaimer, the term of this patent is extended or adjusted under 35 U.S.C. 154(b) by 591 days.

(21) Appl. No.: 18/223,437

(22) Filed: Jul. 18, 2023

(65) Prior Publication Data

US 2025/0028577 A1 Jan. 23, 2025

(51) Int. Cl.
*G06F 3/048* (2013.01)
*G06F 9/54* (2006.01)

(52) U.S. Cl.
CPC .................................... *G06F 9/542* (2013.01)

(58) Field of Classification Search
CPC ........................................................ G06F 9/542
See application file for complete search history.

(56) References Cited

U.S. PATENT DOCUMENTS 10,394,574 B2 * 8/2019 Wu ...................... G06F 9/3887
10,445,732 B2 * 10/2019 Oberheide ........... G06Q 20/401
10,515,081 B2 * 12/2019 Birchall ............ G06F 16/24578
11,080,108 B2 * 8/2021 Ghosh ..................... G06F 9/542
11,477,246 B2 * 10/2022 Raleigh ................. G06F 15/177
12,118,044 B2 * 10/2024 Ricci ...................... G06F 16/951
2010/0281409 A1 * 11/2010 Rainisto .................. G06F 9/451 715/767
2014/0256288 A1 * 9/2014 Allen .................. H04W 12/086 455/411
2019/0235936 A1 * 8/2019 Murdock .............. H04W 68/02
2020/0310858 A1 * 10/2020 Ren ...................... G06F 3/04817
2021/0226846 A1 * 7/2021 Ballard ............... H04L 41/0843

(Continued)

OTHER PUBLICATIONS

Daugherty et al., "Automatic Access Control of Calls Made Over Named Pipes With Optional Calling Context Impersonation" U.S. Appl. No. 17/965,541, filed Oct. 13, 2022, 40 pgs.

(Continued)

*Primary Examiner* — David Phantana-angkool

(74) *Attorney, Agent, or Firm* — Egan, Enders & Huston LLP.

(57) ABSTRACT

Systems and methods are provided that may be implemented to utilize a centralized common notification manager logic that is locally on an information handling system to display on-screen notifications (such as pop-up notifications) to one or more current system users from multiple different operating system (OS) services, and/or to receive system user input via these displayed on-screen notifications, without use of any network communication between the notification manager logic and the respective user application space/s of the current system user/s that execute on the information handling system. The disclosed systems and methods may be so implemented without requiring each OS service to have its own dedicated separate and different interface and/or process that is executing in the logged-in user's application space.

21 Claims, 13 Drawing Sheets

(56) References Cited

U.S. PATENT DOCUMENTS

| | | | | |
|---|---|---|---|---|
| 2022/0334836 | A1 | 10/2022 | Ruiz et al. | |
| 2022/0342963 | A1* | 10/2022 | Gehtman | G06N 20/00 |
| 2024/0061845 | A1* | 2/2024 | Katariya | G06F 16/24575 |
| 2024/0419672 | A1* | 12/2024 | Katariya | G06F 16/24575 |
| 2025/0028577 | A1* | 1/2025 | Daugherty | G06F 9/542 |
| 2025/0117267 | A1* | 4/2025 | Ruiz | G06F 9/485 |
| 2025/0335270 | A1* | 10/2025 | Rajagopalan | G06F 8/65 |
| 2025/0356725 | A1* | 11/2025 | Nowak | G07F 17/3225 |
| 2026/0023799 | A1* | 1/2026 | Mcdermott | G06F 16/9536 |
| 2026/0025436 | A1* | 1/2026 | Murphy | G06F 9/5072 |
| 2026/0050600 | A1* | 2/2026 | Katariya | G06F 16/24575 |
| 2026/0067098 | A1* | 3/2026 | Jose | H04L 9/3247 |

OTHER PUBLICATIONS

Microsoft, "Security Identifiers", Apr. 9, 2023, 23 pgs.
Wikipedia, "User Indentifier", Obtained from Internet Jul. 9, 2023, 5 pgs.

* cited by examiner

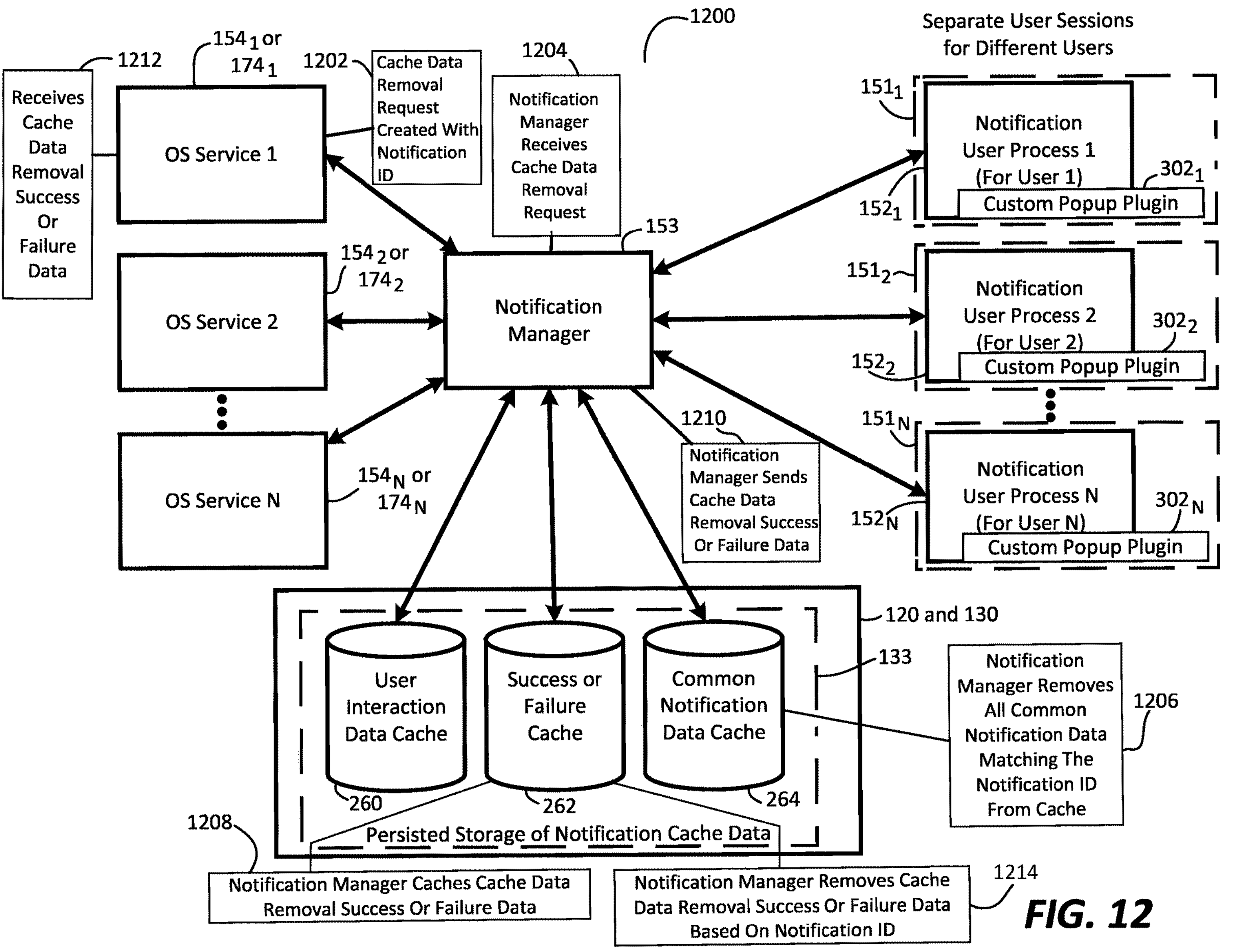
1200
Separate User Sessions for Different Users
1212
Receives Cache Data Removal Success Or Failure Data
$154_1$ or $174_1$
OS Service 1
1202
Cache Data Removal Request Created With Notification ID
1204
Notification Manager Receives Cache Data Removal Request
153
Notification Manager
$154_2$ or $174_2$
OS Service 2
OS Service N
$154_N$ or $174_N$
$151_1$
Notification User Process 1 (For User 1)
$302_1$
Custom Popup Plugin
$152_1$
$151_2$
Notification User Process 2 (For User 2)
$302_2$
Custom Popup Plugin
$152_2$
$151_N$
Notification User Process N (For User N)
$302_N$
Custom Popup Plugin
$152_N$
1210
Notification Manager Sends Cache Data Removal Success Or Failure Data
120 and 130
133
User Interaction Data Cache
260
Success or Failure Cache
262
Common Notification Data Cache
264
Persisted Storage of Notification Cache Data
Notification Manager Removes All Common Notification Data Matching The Notification ID From Cache
1206
1208
Notification Manager Caches Cache Data Removal Success Or Failure Data
Notification Manager Removes Cache Data Removal Success Or Failure Data Based On Notification ID
1214
FIG. 12

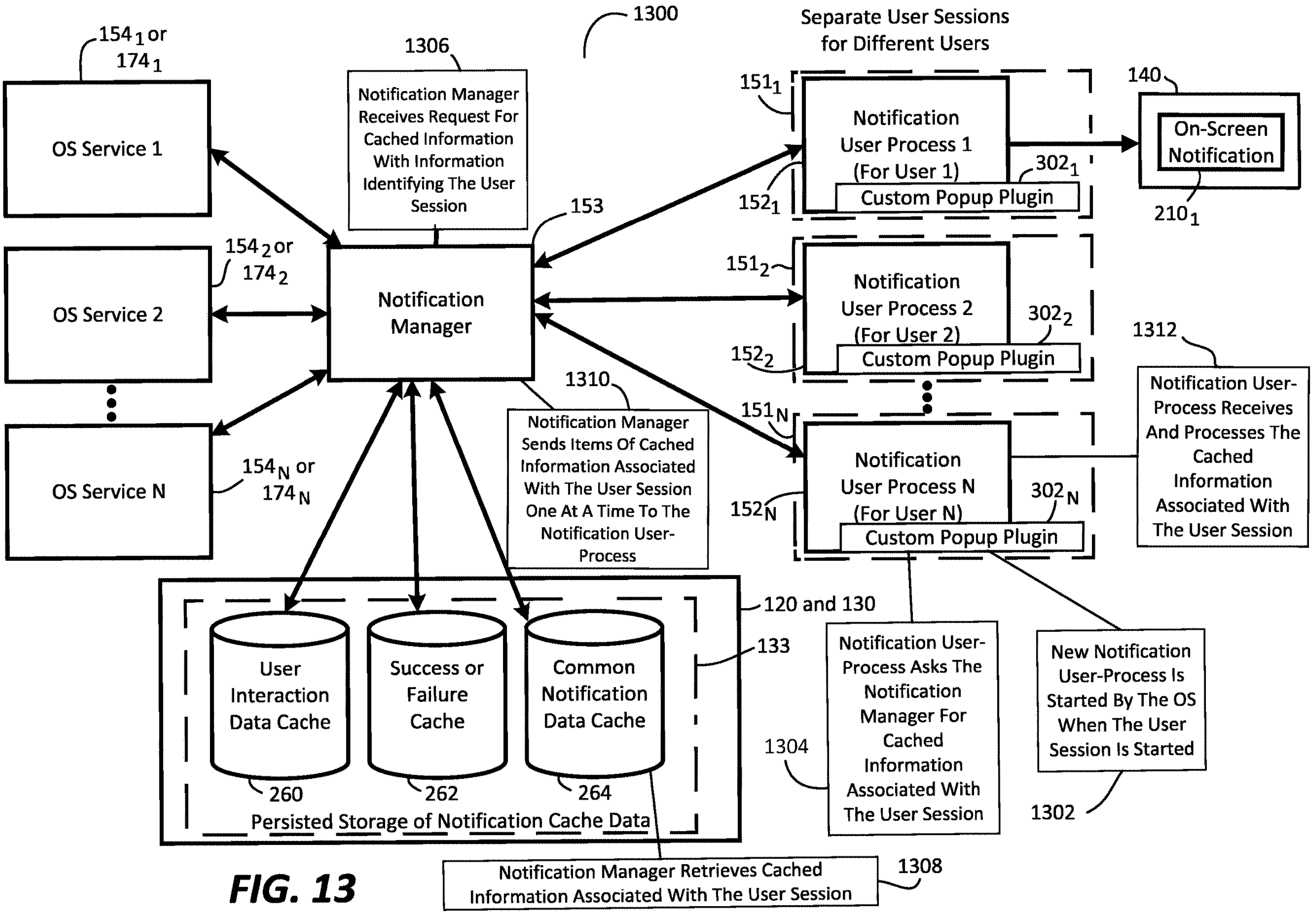
OS Service 1
154₁ or 174₁
OS Service 2
154₂ or 174₂
OS Service N
154N or 174N
1306
Notification Manager Receives Request For Cached Information With Information Identifying The User Session
Notification Manager
153
1300
1310
Notification Manager Sends Items Of Cached Information Associated With The User Session One At A Time To The Notification User-Process
Separate User Sessions for Different Users
151₁
152₁
Notification User Process 1 (For User 1)
302₁
Custom Popup Plugin
151₂
152₂
Notification User Process 2 (For User 2)
302₂
Custom Popup Plugin
151N
152N
Notification User Process N (For User N)
302N
Custom Popup Plugin
140
On-Screen Notification
210₁
1312
Notification User-Process Receives And Processes The Cached Information Associated With The User Session
User Interaction Data Cache
260
Success or Failure Cache
262
Common Notification Data Cache
264
Persisted Storage of Notification Cache Data
120 and 130
133
1304
Notification User-Process Asks The Notification Manager For Cached Information Associated With The User Session
New Notification User-Process Is Started By The OS When The User Session Is Started
1302
Notification Manager Retrieves Cached Information Associated With The User Session
1308
FIG. 13

DISTRIBUTED AND PERSISTED USER NOTIFICATIONS

FIELD

This application relates to information handling systems and, more particularly, to display of notifications by operating system services executing on information handling systems.

BACKGROUND

As the value and use of information continues to increase, individuals and businesses seek additional ways to process and store information. One option available to human users is information handling systems. An information handling system generally processes, compiles, stores, and/or communicates information or data for business, personal, or other purposes thereby allowing human users to take advantage of the value of the information. Because technology and information handling needs and requirements vary between different human users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific human user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

A software ecosystem may execute multiple processes on a computer system without dedicated user interfaces, such as a collection of operating system services such as Windows Services or Linux Daemons. Sometimes, each such process may need to display an on-screen popup or other on-screen notification (such as Windows Action Center notification) to a user who is logged-in on the computer system. Such a notification may contain information such as progress status (e.g., "Encryption Progress 42%") or may contain a request for the logged-in user to take some action or provide user input, e.g., such as to confirm a system reboot.

In one past operating system implementation, each different given operating system (OS) service that is logged-in as itself on a computing system could be separately allowed to generate its own separate and different user interface for the logged-in user via an "Allow Service to Interact with Desktop" feature that could be separately enabled for the given operating system service by the logged-in user. This past implementation required a separate and different user interface to be generated by each operating system service, such that multiple operating system services were required to generate multiple separate and different respective user interfaces on the computer system.

It is known to give each OS service its own corresponding separate and dedicated respective user application space process that runs in the logged-in user's application space to display on-screen popup notifications. However, when each OS service is provided with its own corresponding dedicated user space application process that runs in the user's application space to display on-screen popup notifications, the communication between the operating system service and its dedicated user space application process becomes complicated because one of the operating system service or its dedicated user space application process may not be running when it is needed. For example, the user space application process may not be running when the operating system service needs to display a popup notification, or the operating system service may not be running when the user interacts with the corresponding displayed on-screen popup notification.

Short message service (SMS) has been used to push notifications from a local process running on a user's smart phone to a web browser also running on the user's smart phone. These notifications are cached on a cloud-based server, and require the local processes to connect via a network to the cloud first, and then require the web browser to connect to the cloud.

Microsoft Windows Action Center allows processes to display on-screen popups to the logged-in user. However, this is on a per-application basis. Additionally, when the user interacts with the on-screen popup, Windows Action Center then starts the process that requested the on-screen popup. If the process that requested the on-screen popup does not start or does not start in time, the process will fail to receive the user interaction data.

SUMMARY

Disclosed herein are systems and methods that may be implemented to utilize a centralized common notification manager logic that is locally on an information handling system to display on-screen notifications (such as pop-up notifications) to one or more current system users from multiple different operating system (OS) services, and/or to receive system user input via these displayed on-screen notifications, without use of any network communication between the notification manager logic and the respective user application space/s of the current system user/s that execute on the information handling system. The disclosed systems and methods may be so implemented without requiring each OS service to have its own dedicated separate and different interface and/or process that is executing in the logged-in user's application space. In one embodiment, the centralized common notification manager logic of the disclosed systems and methods may be so implemented entirely locally on the same information handling system to handle and control the communication between the different OS services and a separate respective notification user process that is locally executing in each current user's application space.

In one embodiment, the disclosed centralized common notification manager logic may be implemented to display on-screen notifications from each different OS service, and to receive user input for each different OS service, without generating a separate and different user interface for each different OS service, without providing a separate respective dedicated user space application process permanently dedicated to each different OS service, without using a OS "Allow Service to Interact with Desktop" or similar OS feature that must be separately enabled for each different operating system service by a logged-in user, and without using any network communications from the centralized common notification manager logic to each current user's application space to manage the on-screen notifications and without using any network communications from each user's application space to receive user input in the centralized common notification manager logic. This embodiment may be implemented, for example, to improve system efficiency and to utilize less system processing resources (e.g., central processing unit utilization) to display on-screen notifications from each different OS service, and to receive user input for each of the different OS services, than is required by conventional techniques that utilize a different separate conventional process permanently dedicated to each different given OS service that is executing in the logged-in user's application space to only display on-screen notifications to the user from that given OS service, and to only receive user input from that given OS service.

In one embodiment, the centralized common notification manager logic of the disclosed systems and methods may be advantageously implemented to simplify communications between each of the OS services and the user's application space when displaying on-screen notifications from each of the different OS services and when accepting any user input requested by the on-screen notifications. In this regard, the disclosed centralized common notification manager logic may be implemented entirely locally on an endpoint information handling system, and without using any network communications between the local centralized common notification manager logic and each current user's application space to improve reliability of the display of each on-screen notification to a user (and to improve the reliability of the receipt of user input response to the on-screen notification) as compared to conventional techniques by ensuring that each on-screen notification from each different given OS service is successfully displayed to a user and is available when viewed by the user to receive any user input that is requested by the displayed on-screen notification and to provide this received user input to the given OS service.

In one embodiment, the centralized common notification manager logic of the disclosed systems and methods may be implemented locally on an endpoint information handling system to interface with OS service software of a separate software stack that may be executing locally on the same endpoint information handling system, or that may be executing remotely on a separate and different remote information handling system via a Web push functionality across a network (e.g., such as the Internet) that is coupled by the network to the endpoint information handling system. In one embodiment, once a request for an on-screen notification change (e.g., displaying, updating, or removing an on-screen notification) is received from an OS service of the software stack by the centralized common notification manager logic, the on-screen notification change may be sent to the user's application space and the user as soon as the user logs into their endpoint. In a further embodiment, the user's interaction with the on-screen notification (e.g., input made by the user via the on-screen notification) may be held within a cache of the notification manager logic on the endpoint information handling system until the requester (i.e., OS service) of the on-screen notification is available to receive any applicable user interaction data (e.g., such as user input that is requested by the on-screen notification).

In one embodiment, the centralized common notification manager logic may execute locally on the endpoint information handling system together with a single separate respective user application space process ("notification user process") that is separately provided for each given currently logged-in user and that executes in the given user's application space. In this embodiment, the centralized common notification manager logic may implement a many-to-one architecture between multiple different background OS service processes (i.e., requestors of on-screen notifications) and each given currently logged-in user's notification user process (i.e., which displays requested on-screen notifications for any of the different background OS service processes to the given logged-in user), and using only as many separate notification user processes as there are currently logged-in users (i.e., a single different notification user process is separately provided for each currently logged-in user). In this way, the overall memory footprint on the endpoint information handling system may be reduced as compared to a conventional solution that requires the presence of a separate respective conventional user space application process that is dedicated to each given background OS service for only displaying on-screen pop ups for that given background OS service. This is because the conventional requires that every different given background OS service be provided with its own separate and different conventional user application space process to display on-screen popups for that given background OS service, which increases the overall required memory footprint consumed on a conventional information handling system.

In one respect, disclosed herein is a method, including using at least one programmable integrated circuit of an information handling system to: execute one or more notification user processes within different respective user application spaces on the information handling system; execute a notification manager process in communication with each of the notification user processes and with multiple different background operating system (OS) services; and execute the notification manager process to: receive a first notification request including first common notification data specifying a first desired common on-screen notification layout from a first one of the multiple different background OS services, the first common notification data designating at least one of the notification user processes and specifying a first requested on-screen notification for display to a user in the user application space of the designated notification user process, assign a first unique identifier to the first requested on-screen notification and provide the first unique identifier to the first one of the multiple different background OS services, find the at least one notification user process designated by the first common notification data, and send the received first common notification data with the first unique identifier of the first requested on-screen notification to the designated notification user process. The method may further include using the at least one programmable integrated circuit of the information handling system to execute the designated notification user process to attempt to display the specified first requested on-screen notification to a user on a display device of the information handling system and in the user application space of the designated notification user process.

In another respect, disclosed herein is an information handling system, including at least one programmable integrated circuit that is programmed to: execute one or more notification user processes within different respective user application spaces on the information handling system; execute a notification manager process in communication with each of the notification user processes and with multiple different background operating system (OS) services; and execute the notification manager process to: receive a first notification request including first common notification data specifying a first desired common on-screen notification layout from a first one of the multiple different background OS services, the first common notification data designating at least one of the notification user processes and specifying a first requested on-screen notification for display to a user in the user application space of the designated notification user process, assign a first unique identifier to the first requested on-screen notification and provide the first unique identifier to the first one of the multiple different background OS services, find the at least one notification user process designated by the first common notification data, and send the received first common notification data with the first unique identifier of the first requested on-screen notification to the designated notification user process. The at least one programmable integrated circuit of the information handling system may be programmed to execute the designated notification user process to attempt to display the specified first requested on-screen notification to a user on a display device of the information handling system and in the user application space of the designated notification user process.

BRIEF DESCRIPTION OF THE DRAWINGS

FIG. 12 illustrates methodology according to one exemplary embodiment of the disclosed systems and methods.

FIG. 13 illustrates methodology according to one exemplary embodiment of the disclosed systems and methods.

DESCRIPTION OF ILLUSTRATIVE EMBODIMENTS

Figure 1:
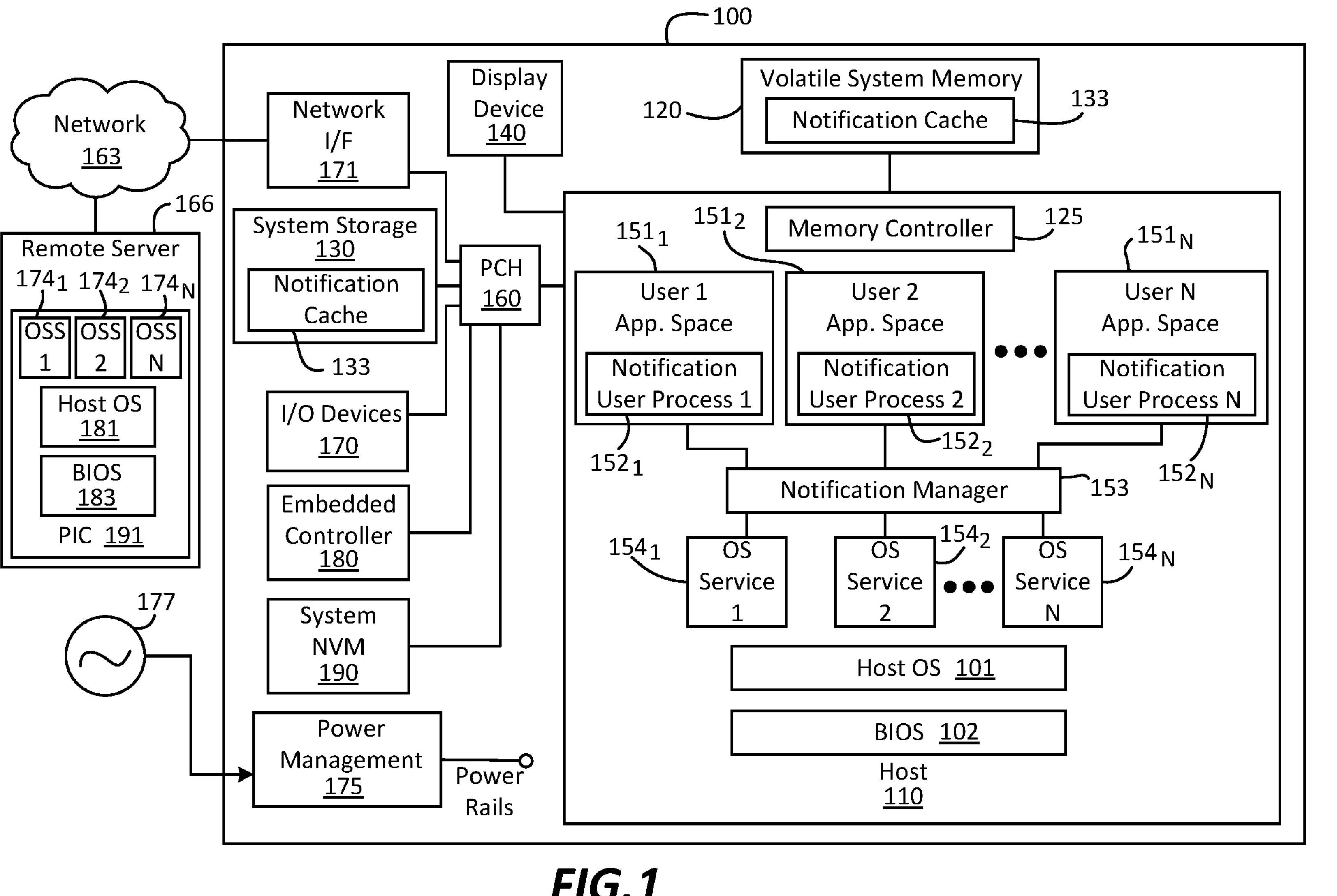
FIG. 1 illustrates a block diagram of an information handling system according to one exemplary embodiment of the disclosed systems and methods.

FIG. 1 is a block diagram of a local endpoint information handling system 100 (e.g., a desktop or all-in-one computer, computer server, laptop or notebook computer, tablet or convertible computer, etc.) as it may be optionally coupled via a network 163 to at least one other information handling system 166 (e.g., a remote information handling system such as a remote computer server) according to one embodiment of the disclosed systems and methods. In this regard, it should be understood that the configuration of FIG. 1 is exemplary only, and that the disclosed methods may be implemented on other types and/or configuration of information handling systems. It should be further understood that while certain devices and components of an information handling system are shown in FIG. 1 for illustrating embodiments of the disclosed systems and methods, the information handling system is not restricted to including only those devices and components shown in FIG. 1 and described below.

As shown in FIG. 1, endpoint information handling system 100 may include a host programmable integrated circuit 110 that executes a host operating system (OS) 101 (e.g., such as Microsoft Windows 10, Linux, etc.) and BIOS 102 (e.g., unified extensible firmware interface BIOS) for system 100, and one or more currently-active user application spaces 151$_1$ to 151$_N$ in each of which user applications separately execute for a respective separate and different user that is each currently logged-in to a user session on OS 101. Although multiple user application spaces 151$_1$ to 151$_N$ may be simultaneously active for multiple separate respective logged-in users, it will be understood that only a single user application space 151 may be active at any given time and/or that only a single user application space 151 may be enabled for use by a single user on a given information handling system 100.

As shown in FIG. 1, host programmable integrated circuit 110 also executes multiple background OS services 154$_1$ to 154$_N$ (e.g., such as Windows services or Linux Daemons, etc.) communicating with a single notification manager 153 that optionally writes to and reads from a notification cache 133 stored on system nonvolatile storage 130 (e.g., one or more media drives, such as hard disk drives, optical drives, NVRAM, Flash memory, solid state drives "SSDs", and/or any other suitable form of internal or external nonvolatile storage) and/or volatile system memory 120 (e.g., dynamic random access memory "DRAM", synchronous dynamic random-access memory "SDRAM", etc.) that is coupled as shown to host programmable integrated circuit 110.

Although not required, one or more of background OS services 154$_1$ to 154$_N$ may be executing as a service in elevated mode (e.g., running in administrator level mode and not in user level mode). Additionally each of background OS services 154$_1$ to 154$_N$ runs whenever OS 101 of information handling system 100 is booted and operating, and regardless of whether or not any of respective users of endpoint information handling system 100 is currently logged-in to their respective user application spaces 151$_1$ to 151$_N$ on OS 101. Examples of elevated background OS services 154$_1$ to 154$_N$ include, but are not limited to, information technology (IT) admin utilities, antivirus software, push notification systems, and continual integration (CI)/continual deployment (CD) build systems. Other examples of elevated background OS services 154$_1$ to 154$_N$ include, but are not limited to, OS services which optimize the performance of the hardware and can access privileged functions such as BIOS settings, driver interop and OS administrative functions, OS services which provide access to an encrypted and administrator-protected database, OS services which can attempt privileged OS actions in order to remediate identified issues with the host, OS services that can interact with protected BIOS settings to overclock a gaming personal computer (PC), etc.

Still referring to the embodiment of FIG. 1, separate notification user processes 152$_1$ to 152$_N$ are provided that each executes within a corresponding one of respective active user application spaces 151$_1$ to 151$_N$ as shown, e.g., so that a separate and different dedicated notification user process 152 is provided for each different user. Each given one of separate notification user processes 152$_1$ to 152$_N$ communicates as shown with single notification manager 153 when its corresponding user application space 151 is active (i.e., when the respective user of the given user application space is logged-in to a user session on OS 101).

Although, in the embodiment of FIG. 1, multiple background OS services 154$_1$ to 154$_N$ are executing on the same host OS 101 of a single common information handling system 100 and active user application spaces 151$_1$ to 151$_N$, it will be understood that in other embodiments background OS services 154$_1$ to 154$_N$ may be executing on a separate and different (e.g., remote) information handling system from the endpoint information handling system 100 (which executes active user application spaces 151$_1$ to 151$_N$, notification user processes 152$_1$ to 152$_N$, and centralized common notification manager logic 153). For example, centralized common notification manager logic 153 executing on endpoint information handling system 100 may be communicating with multiple elevated background OS services 174$_1$ to 174$_N$ that are executing with a separate host OS 181 and BIOS 183 on a programmable integrated circuit (PIC) 191 of a remote server 166 which in one embodiment may be configured with similar components as described herein for information handling system 100.

Still referring to the embodiment of FIG. 1, host programmable integrated circuit 110 may include any type of processing device, such as an Intel central processing unit (CPU), an Advanced Micro Devices (AMD) CPU or another programmable integrated circuit. An integrated memory controller 125 also executes within host programmable integrated circuit 110 to manage reads and writes to volatile system memory 120.

Still referring to FIG. 1, host programmable integrated circuit 110 may be coupled to an external or internal (integrated) display device 140 (e.g., LCD or LED display or other suitable display device) depending on the particular configuration of information handling system 100. In the illustrated embodiment, integrated graphics capability may be implemented by host programmable integrated circuit 110 to provide visual images (e.g., a graphical user interface, static images and/or video content) to a system user. However, in other embodiments, a separate programmable integrated circuit (e.g., such as graphics processor unit "GPU") may be coupled between host programmable integrated circuit 110 and display device 140 to provide graphics capability for information handling system 100.

In the embodiment of FIG. 1, a platform controller hub (PCH) 160 is coupled to control certain data paths and manage information flow between devices and components of the information handling system 100. As such, PCH 160 may include one or more integrated controllers/microcontrollers and/or interfaces for controlling the data paths connecting PCH 160 with host programmable integrated circuit 110, system storage 130, external and/or integrated input/output (I/O) devices 170 (e.g., such as one or more of touchpad, keyboard, mouse, touchscreen and associated controllers thereof) forming at least a part of a user interface for the information handling system. In the embodiment of FIG. 1, I/O devices 170 may be coupled to PCH 160 of system 100 to enable a system user to input data and interact with information handling system 100, and to interact with application programs or other software/firmware executing thereon.

Also shown in FIG. 1 are other components of system 100 that may include network interface (I/F) device 171, system NVM 190 (e.g., serial peripheral interface (SPI) Flash memory) which stores firmware images and other code for operation of system 100, and embedded controller (EC) 180 that may be configured with a microcontroller or other programmable integrated circuit to perform functions such as power/thermal system management and to execute program instructions to boot information handling system 100, etc.

In one embodiment, PCH 160 may include a Serial Peripheral Interface (SPI) controller and an Enhanced Serial Peripheral Interface (eSPI) controller. In some embodiments, PCH 160 may include one or more additional integrated controllers or interfaces such as, but not limited to, a Peripheral Controller Interconnect (PCI) controller, a PCI-Express (PCIe) controller, a low pin count (LPC) controller, a Small Computer Serial Interface (SCSI), an Industry Standard Architecture (ISA) interface, an Inter-Integrated Circuit ($I^2C$) interface, a Universal Serial Bus (USB) interface and a Thunderbolt™ interface.

Figure 2:
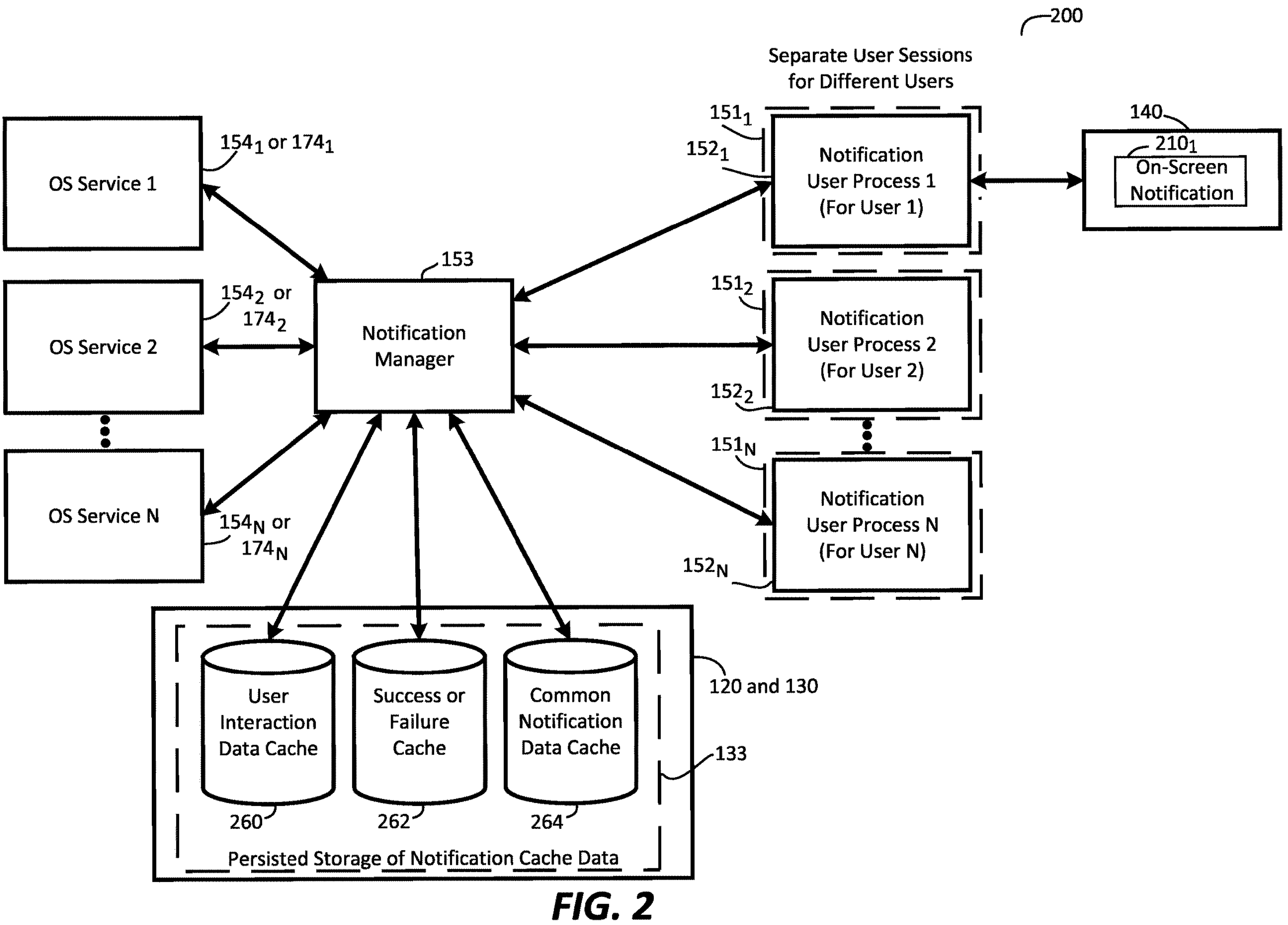
FIG. 2 illustrates layout and interrelation between selected components of a software ecosystem according to one exemplary embodiment of the disclosed systems and methods.

FIG. 2 illustrates one exemplary embodiment of a layout and interrelation between selected components of a software ecosystem 200 of the disclosed systems and methods as they may be implemented using a single common notification manager 153 to display on-screen notifications 210 (such as pop-up notifications) on a display device 140 to multiple currently logged-in users 1 to N on host OS 101 of an endpoint information handling system 100. In one embodiment, notification manager logic 153 may be an application that runs as a dedicated OS background-process (e.g., at an elevated level) which is responsible for managing notification requests.

In FIG. 2, multiple different users 1 to N are logged-in to different respective user sessions on host OS 101 of information handling system 100. As shown, each of the different respective user sessions on host OS 101 provides a respective currently-active user application space 151$_1$ to 151$_N$ (e.g., as a separate desktop environment) for a respective one of the currently logged-in users 1 to N, and includes a respective notification user process 152$_1$ to 152$_N$ running in the respective user application space 151$_1$ to 151$_N$ for that respective user 1 to N as shown. Thus, when multiple users 1 to N are simultaneously logged into the computer at the same time, there is a different user application space 151$_1$ to 151$_N$ currently running in parallel with a respective notification user process 152, i.e., with one separate user application space 151 and its separate notification user process 152 currently running for each different logged-in user 1 to N (e.g., user application space 151$_1$ with notification user process 152$_1$ running for logged-in user 1, user application space 151$_2$ with notification user process 152$_2$ running for different logged-in user 2, . . . and user application space 151$_N$ with notification user process 152$_N$ running for logged-in user N in FIG. 2).

In the embodiment of FIG. 2, a respective notification user process 152 is started together with its respective user application space 151 when each respective user logs into their respective user application space 151, and neither the user application space 151 or its notification user process 152 runs when their corresponding user is not logged into the user's respective user application space 151 (e.g., each given user's application space 151 with its notification user process 152 closes when the given user logs out of their respective user application space 151).

Still referring to FIG. 2, each of background OS services 154$_1$ to 154$_N$ (or 174$_1$ to 174$_N$) may be a process or other piece of software code. In one embodiment, this OS service software code may be executed as background OS services 154$_1$ to 154$_N$ on the same local endpoint information handling system 100 as the other remaining software components of FIG. 2. In another embodiment, this OS service software code may be executed as background OS services 174$_1$ to 174$_N$ on a remote information handling system (e.g., remote server 166) coupled by network 163 to local endpoint information handling system 100, while the other remaining software components of FIG. 2 are executed on the local endpoint information handling system 100. In one embodiment, each of background OS services $154_1$ to $154_N$ (or $174_1$ to $174_N$) may be a long running process that runs in the background and has no user interface. In one embodiment, each of background OS services $154_1$ to $154_N$ (or $174_1$ to $174_N$) may be running as elevated system level processes, although this does not have to be the case.

As shown in FIGS. 1 and 2, notification manager 153 communicates (e.g., directly) with each of the "N" number of separate notification user processes $152_1$ to $152_N$. In one embodiment, notification manager 153 may also be in communication with, and globally available to, all other background OS services $154_1$ to $154_N$ (or $174_1$ to $174_N$) to allow each of these other background OS services $154_1$ to $154_N$ (or $174_1$ to $174_N$) to request on-screen notifications via notification manager 153. Additional information regarding example techniques that may be optionally implemented for communication between each of other background OS services $154_1$ to $154_N$ (or $174_1$ to $174_N$) and notification manager 153, and between notification manager 153 and each of notification user processes $152_1$ to $152_N$ may be found described in U.S. patent application Ser. No. 17/231,384 filed on Apr. 15, 2021, which is incorporated herein by reference in its entirety for all purposes.

In FIG. 2, each given one of on-screen notifications 210 may be requested by one of multiple different background OS services $154_1$ to $154_N$ (or $174_1$ to $174_N$) and, when requested or otherwise indicated, each given one of these on-screen notifications 210 may receive user input from a currently logged-in user to which the given on-screen notification is displayed. In one embodiment, an on-screen notification 210 may be a graphical user interface window displayed by a respective notification user process 152 on display device 140 to its currently logged-in user, e.g., as an on-screen pop up in the form of a native OS graphical user interface (GUI) technology such as WinForms, Windows Presentation Foundation (WPF), Qt ("cute"), etc. In one embodiment, each of notification user processes $152_1$ to $152_N$ may offer a pre-defined set of multiple common on-screen notification (e.g., popup) layouts as templates that may be selected for use to display a requested user interface of an on-screen notification 210, e.g., such as a progress bar for an ongoing process, two or more input buttons for accepting user click input, a single input button for accepting user click input, one or more check boxes for accepting user click input, a text box for accepting user text, etc.

In one embodiment, a requesting background OS service 154 or 174 formulates (i.e., specifies) and transmits common notification data to the designated notification user process/es 152 via notification manager 153 when requesting display of a given on-screen notification 210. This transmitted common notification data specifies the desired common on-screen notification layout (e.g., desired template of graphical user interface (GUI) or other user interface display for accepting user input) to be used by the designated notification user process/es 152 to display the requested user interface of the given on-screen notification 210 and also includes resource strings and/or text for the requested given on-screen notification 210. In this regard, each of multiple notification user processes $152_1$ to $152_N$ may be programmed to recognize and implement the desired common on-screen notification layout specified by the transmitted common notification data.

In one embodiment, common notification data formulated by a requesting background OS service 154 or 174 may also specify text for display by the requested given on-screen notification 210, a time duration for display of the requested given on-screen notification 210 and/or a time duration (e.g., such as 3 days or any selected greater or lesser duration of time) for maintaining data associated with the requested on-screen notification 210 in optional notification cache 133 (which is described further herein). In one embodiment, each of notification user processes $152_1$ to $152_N$ may also support multiple different languages such that a requested on-screen notification 210 will be displayed in a language selected (e.g., by the current user) for the notification user processes $152_1$ to $152_N$.

In one embodiment, a requesting background OS service 154 or 174 may specify different text for display, and/or may select from multiple different available common on-screen notification layouts (e.g., different templates having different combinations and/or numbers of input buttons for accepting user click input, different combinations and/or numbers of check boxes for accepting user click input, different combinations and/or numbers of text boxes for accepting user text, etc.) to be used by the designated notification user process/es 152 to display the requested user interface of the given on-screen notification 210. In this way, different requesting background OS service 154 or 174 may request display of different respective layouts of on-screen notifications 210 from each other, and/or may request display of different layouts of on-screen notifications in different corresponding instances of transmitted common notification data.

In one embodiment, notification manager 153 is responsible for distributing a given on-screen notification 210 requested by a given initiating background OS service 154 to one or more selected notification user processes that satisfy notification distribution requirements that are designated for the given on-screen notification 210 (e.g., as may be specified by the requesting background OS service 154 in the common notification data transmitted to notification manager 153). For example, a given on-screen notification 210 may be selected for display to every user logged into information handling system 100, a specific user logged into information handling system 100 (as illustrated in FIG. 2), or other combinations or groups of users logged into information handling system 100 (e.g., such as displayed only to users logged-in as Administrator accounts, displayed only to users logged-in as Guest accounts, displayed only to users logged-in as superuser accounts, etc.

Still referring to FIG. 2, persisted storage of notification manager cache data may be optionally maintained in optional notification cache 133, e.g., with duplicate copies of notification cache 133 stored and maintained on both system storage 130 and main system memory 120 of information handling system 100. In one embodiment, notification cache 133 may include user interaction data cache 260, success or failure cache 262, and common notification data cache 264. In one optional embodiment, notification manager 153 caches all communication (e.g., including common notification data) between notification manager 153 and each of background OS services $154_1$ to $154_N$ (or $174_1$ to $174_N$) in common notification data cache 264 since it is possible that the between the background OS services $154_1$ to $154_N$ (or $174_1$ to $174_N$) and the notification manager 153 could go down at any time. In one optional embodiment, notification manager 153 caches all communication between notification manager 153 and each of notification user processes $152_1$ to $152_N$ in user interaction data cache 260 since it is possible that the communication channel between notification manager 153 and any number of the notification user processes 152$_1$ to 152$_N$ may go down at any time.

Still referring to the embodiment of FIG. 2, each given logged-in user may interact with the GUI of a displayed on-screen notification 210 in the given logged-in users application space 151$_1$ by using one or more I/O devices 170 of endpoint information handling system 100, e.g., by entering user interaction data to the displayed GUI of the on-screen notification 210 via one or more of a touchpad, a keyboard, a mouse, a touchscreen, etc. As an example, assuming that background OS service 1542 requested the display of on-screen notification 210$_1$ in user 1's user application space 151$_1$, user 1 may interact with on-screen notification 210$_1$ by entering user interaction data with one or more I/O devices. This user interaction data from user 1 is received by user 1's respective notification user process 152$_1$, which then sends the user interaction data to notification manager 153. The notification manager 153 in turn sends the user interaction data to the given initiating background OS service 154 that requested the on-screen notification 210$_1$, which allows the given initiating background OS service 154 to know how user 1 interacted with (e.g., responded to) the on-screen notification 210$_1$. When multiple users 1 to N are currently logged-in, notification manager 153 operates in the same manner for receiving separate user interaction data from each respective user 1 to N in reaction to a separate respective on-screen notification that is displayed for a requesting background OS service 154 to the respective user in the respective user application space. Since it is possible that the communication channel between notification manager 153 and one or more of notification user processes 152$_1$ to 152$_N$ may go down at any time, all communication (e.g., including user interaction data) that each user process 152$_1$ to 152$_N$ needs to send to notification manager 153 may be optionally cached to optional user interaction data cache 260 so that it can later sent to, or retrieved by, notification manager 153.

Figure 3:
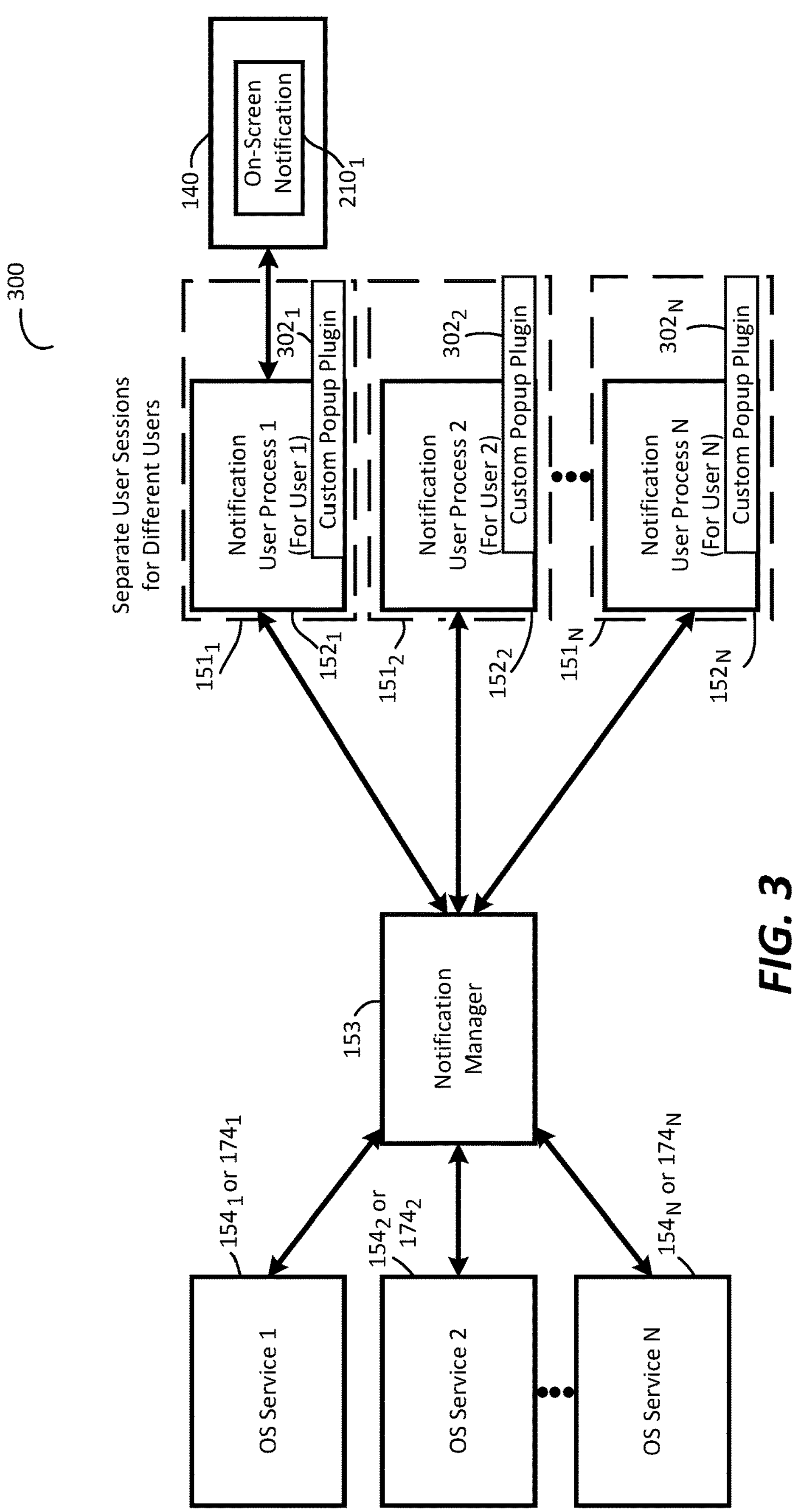
FIG. 3 illustrates layout and interrelation between selected components of a software ecosystem according to one exemplary embodiment of the disclosed systems and methods.

FIG. 3 illustrates another exemplary embodiment of layout and interrelation between selected components of a software ecosystem 300, without notification cache 133 being illustrated. The software ecosystem embodiment of FIG. 3 is otherwise similar to the software ecosystem 200 of FIG. 2, with the exception that a respective application is plugged-in to each respective notification user process 152 (e.g., as plugin code loaded by and onto each respective notification user process 152) to provide a respective custom popup plugin 302 for the respective notification user process 152 as shown. Each of these custom popup plugins 302$_1$ to 302$_N$ may be a notification service programmed to display a requested on screen notification 210. Such a notification service may be optionally provided as a custom popup plugin 302 in the respective user's application space 151 that is native to the host OS 101 such as Windows Action Center notifications which are native to a Microsoft Windows OS, or Chrome Notifications which are native to a Google Chrome OS In the embodiment of FIG. 3, each of respective custom popup plugins 302$_1$ to 302$_N$ is programmed to provide a custom on-screen notification layout that is different from the pre-defined on-screen notification layout options that are provided by the common on-screen notification layout that is integral to its respective notification user process 152. This embodiment may be optionally implemented to allow any given requesting background OS service 154 or 174 to define and use a custom layout for a requested on-screen notification 210 that is different from the pre-defined layout/s provided by the common on-screen notification layout that is integral to each notification user process 152$_1$ to 152$_N$. To cause a custom popup plugin 302 to display an on-screen notification with an custom on-screen notification layout, a given requesting background OS service 154 or 174 may define a data structure that is sent as custom popup data from the given requesting background OS service 154 or 174 to the notification manager 153, then from the notification manager 153 to the designated notification user process 152, and then from the designated notification user process 152, to its respective custom popup plugin 302. In one embodiment, this custom popup data may be transmitted to notification manager 153 by a requesting background OS service 154 or 174 within the common notification data payload as a special custom attribute.

Figure 4:
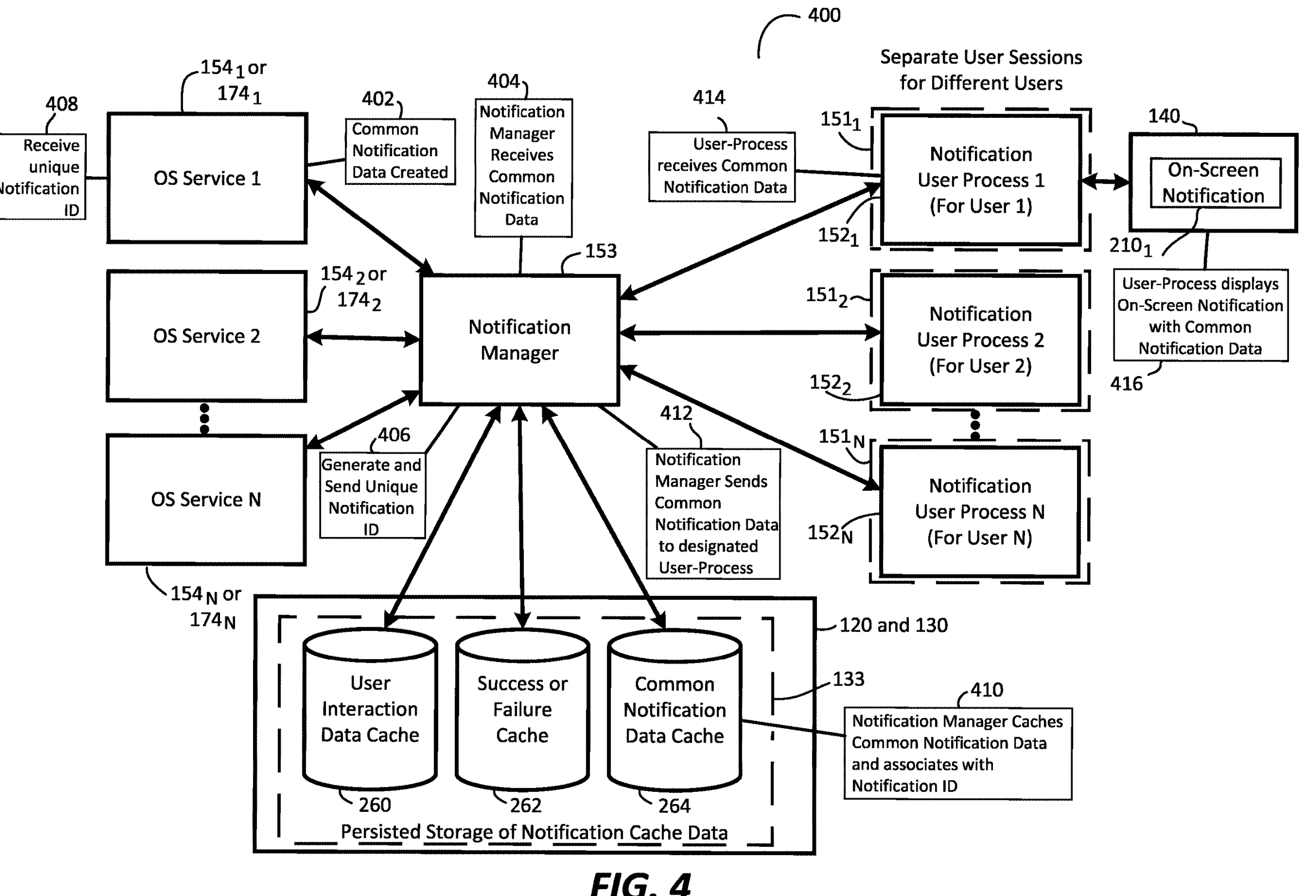
FIG. 4 illustrates methodology according to one exemplary embodiment of the disclosed systems and methods.

FIG. 4 is a flow chart of methodology 400 showing flow of common notification data through a software ecosystem for displaying an on-screen notification 210$_1$ according to one exemplary embodiment of the disclosed systems and methods that corresponds to the software ecosystem 200 of FIG. 2. Methodology 400 begins in block 402 where a current requesting background OS service 154$_1$ or 174$_1$ invokes an appropriate application programming interface (API) to request a new on-screen notification 210$_1$, and common notification data is created by the current requesting background OS service 154$_1$ or 174$_1$ and sent (i.e., transmitted) to notification manager 153. This common notification data specifies, among other things described herein, a designated notification user process (e.g., in this case notification user process 152$_1$) for displaying a specified on-screen notification 210$_1$ to user 1. In an alternative embodiment corresponding to the software ecosystem 300 of FIG. 3, custom popup data may be included within this common notification data sent by the current requesting background OS service 154$_1$ or 174$_1$ for use by custom popup plugin 302$_1$ to display a user notification to user 1.

In block 404, notification manager 153 receives this transmitted common notification data as a notification request from the current requesting background OS service 154$_1$ or 174$_1$. Notification manager then generates a unique notification identifier (ID) for the current specific notification request (and its requested on-screen notification 210$_1$) of FIG. 4, and transmits this notification ID to the current requesting background OS service 154$_1$ or 174$_1$ in block 406, and the current requesting background OS service 154$_1$ or 174$_1$ receives this notification ID in block 408. In one embodiment, this unique notification ID may be used to track the current notification request together with its interaction data and other related communications back and forth between the requesting background OS service 154$_1$ or 174$_1$, notification manager 153, and designated notification user process 152$_1$ (including related acknowledgements to the requesting background OS service 154$_1$ or 174$_1$). In block 410, notification manager 153 caches the received common notification data from the requesting background OS service 154$_1$ or 174$_1$ in common notification data cache 264 and associates this received common notification data with the unique notification ID that was generated in block 406.

In block 412, notification manager 153 finds the specific notification user process 152$_1$ designated by current notification request from the current requesting background OS service 154$_1$ or 174$_1$ (i.e., to which to send the current common notification data), and then sends the current common notification data with the unique notification ID corresponding to the requested on-screen notification 210$_1$ to this designated notification user process 152$_1$. In one embodiment, notification manager 153 may retrieve this current common notification data from common notification data cache 264 and send this common notification data with its unique notification ID corresponding to the requested on-screen notification $\mathbf{210}_1$ to the designated notification user process $\mathbf{152}_1$ when the designated notification user process $\mathbf{152}_1$ is currently available (e.g., currently running) to receive this common notification data with its unique notification ID.

In block 414, the designated notification user process $\mathbf{152}_1$ receives the common notification data sent in block 412 by notification manager 153, and determines if this received common notification data contains custom popup data. In the embodiment of FIG. 4, designated notification user process $\mathbf{152}_1$ determines in block 414 that the received common notification data does not contain custom popup data (i.e., since a custom the designated notification user process $\mathbf{152}_1$ of software ecosystem 400 does not include a custom popup plugin 302 and no custom popup data is therefore included within the common notification data of the current notification request sent by the current requesting background OS service $\mathbf{154}_1$ or $\mathbf{174}_1$).

Figure 6:
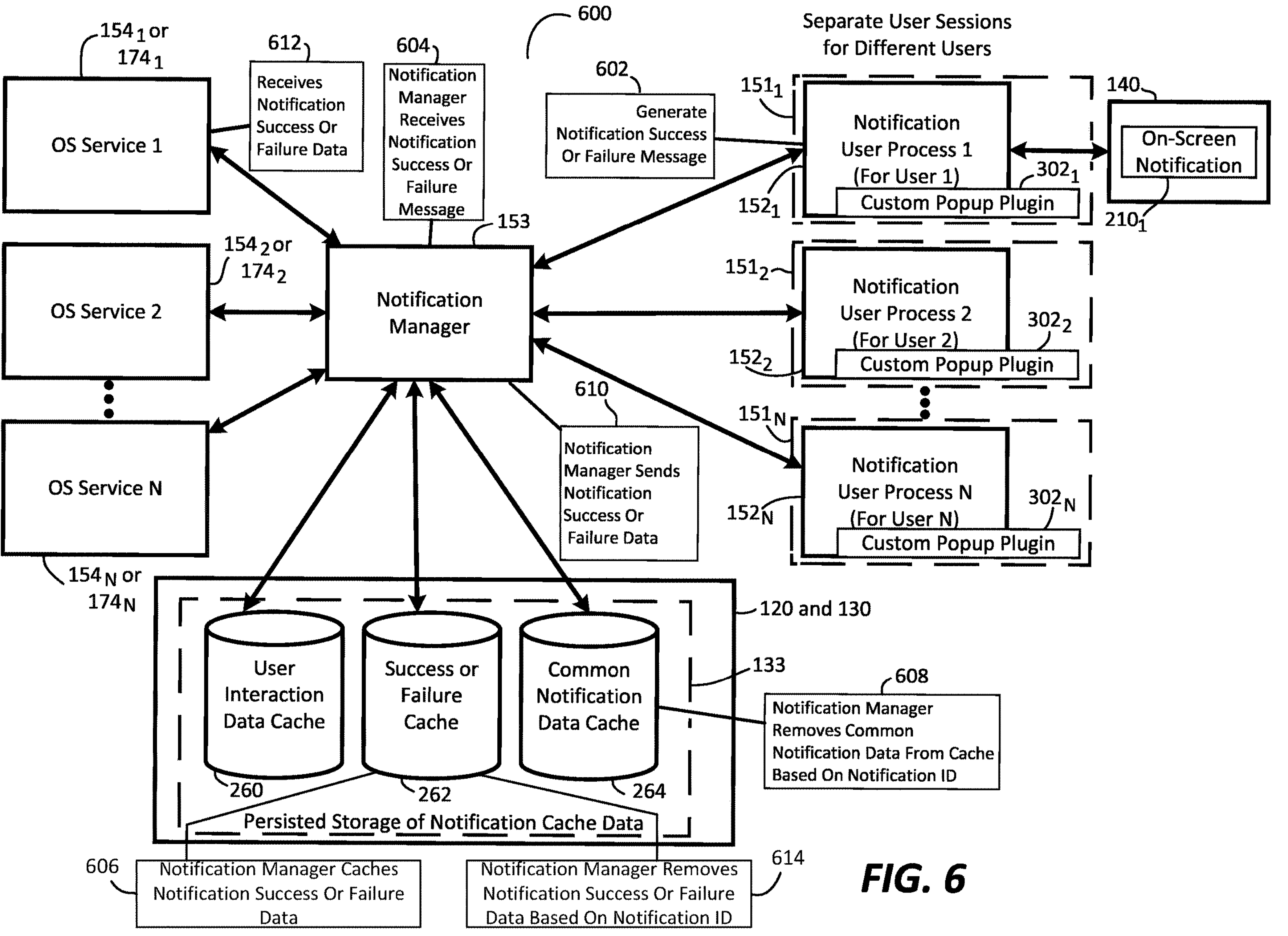
FIG. 6 illustrates methodology according to one exemplary embodiment of the disclosed systems and methods.

In block 416, designated notification user process $\mathbf{152}_1$ then displays the requested on-screen notification $\mathbf{210}_1$ specified by the received common notification data to user 1 on display device 140, and then sends a notification success message with the unique notification ID corresponding to the requested on-screen notification $\mathbf{210}_1$ to the notification manager 153 to acknowledge successful display of the requested on-screen notification $\mathbf{210}_1$, e.g., as illustrated and described herein in relation to FIG. 6. However, in the event that designated notification user process $\mathbf{152}_1$ fails to display the requested on-screen notification $\mathbf{210}_1$, then designated notification user process $\mathbf{152}_1$ sends a notification failure message with the unique notification ID corresponding to the requested on-screen notification $\mathbf{210}_1$ to the notification manager 153, e.g., as illustrated and described herein in relation to FIG. 6.

Figure 5:
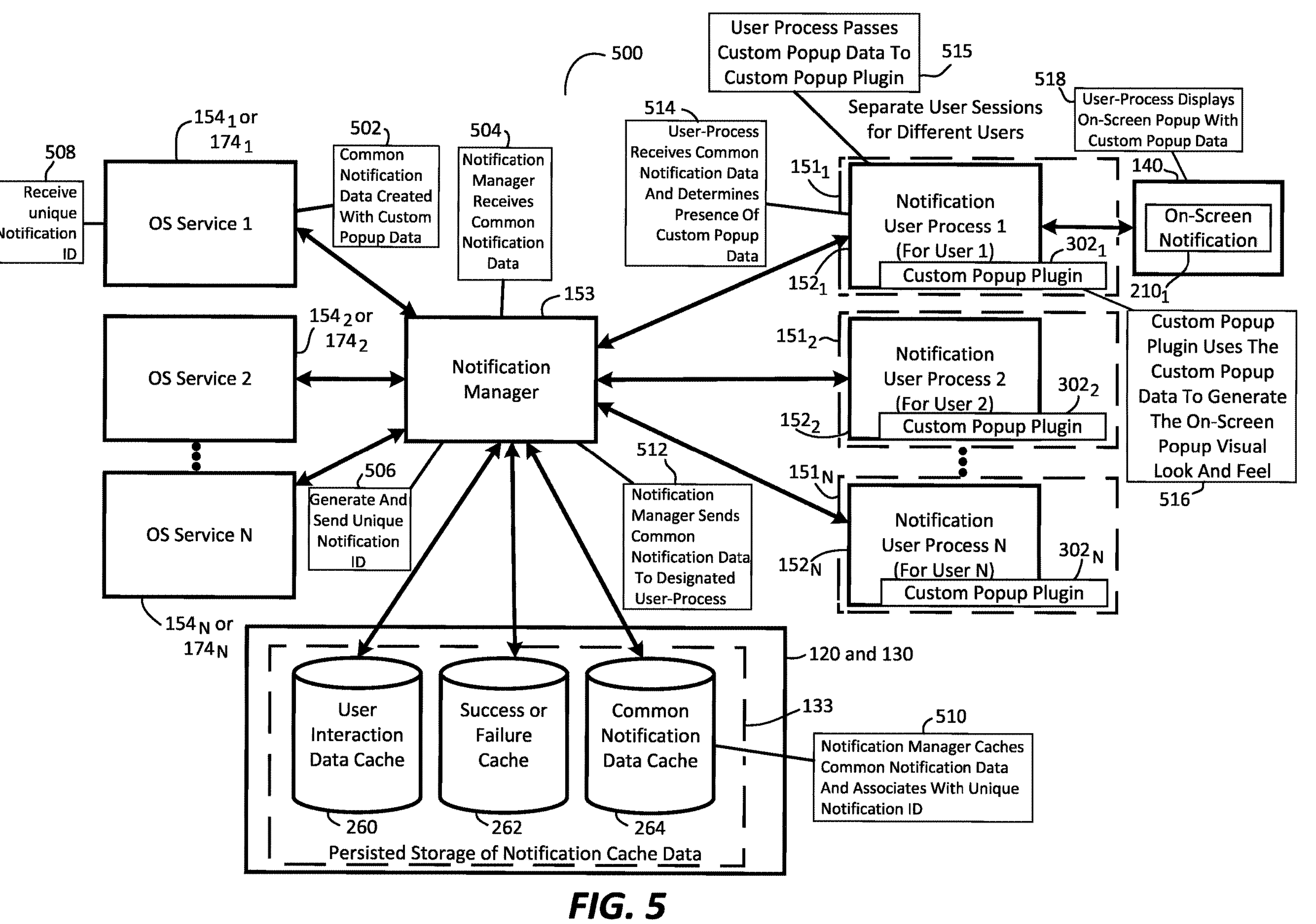
FIG. 5 illustrates methodology according to one exemplary embodiment of the disclosed systems and methods.

FIG. 5 is a flow chart of methodology 500 showing flow of common notification data through a software ecosystem for displaying an on-screen notification $\mathbf{210}_1$ according to one exemplary embodiment of the disclosed systems and methods that corresponds to the software ecosystem 300 of FIG. 3. In this embodiment, a respective custom process plugin 302 is plugged-in to each respective notification user process 152 as previously illustrated and described in relation to FIG. 3. In FIG. 5, the current requesting background OS service $\mathbf{154}_1$ or $\mathbf{174}_1$ invokes an appropriate application programming interface (API) to request a new on-screen notification $\mathbf{210}_1$, and common notification data is created with custom popup data by the current requesting background OS service $\mathbf{154}_1$ or $\mathbf{174}_1$ and sent to notification manager 153. In methodology 500, blocks 504 to 512 proceed in the same manner as respective blocks 402 to 412 of methodology 400, with the exception that the common notification data includes the custom popup data provided by the current requesting background OS service $\mathbf{154}_1$ or $\mathbf{174}_1$.

In block 514 of methodology 500, the designated notification user process $\mathbf{152}_1$ receives the common notification data (with included custom popup data) sent in block 512 by notification manager 153, and then determines that this received common notification data contains custom popup data. Since the common notification data is determined in block 514 to contain custom popup data, the designated notification user process $\mathbf{152}_1$ passes or otherwise provides this custom popup data in block 515 to its respective custom popup plugin $\mathbf{302}_1$. In block 516, custom popup plugin $\mathbf{302}_1$ uses the custom popup data to generate or otherwise create a specified on-screen popup layout (e.g., a specified visual look and feel) and returns this created on-screen layout to the designated notification user process $\mathbf{152}_1$ as information or data to display in the on-screen notification $\mathbf{210}_1$. In block 518, the designated notification user process $\mathbf{152}_1$ then displays the on-screen notification $\mathbf{210}_1$ (with the specified on-screen layout) to user 1 on display device 140, and then sends a notification success message with the unique notification ID corresponding to the requested on-screen notification $\mathbf{210}_1$ to the notification manager 153 to acknowledge successful display of the requested on-screen notification $\mathbf{210}_1$, e.g., as illustrated and described herein in relation to FIG. 6. However, in the event that designated notification user process $\mathbf{152}_1$ fails to display the requested on-screen notification $\mathbf{210}_1$, then designated notification user process $\mathbf{152}_1$ sends a notification failure message with the unique notification ID corresponding to the requested on-screen notification $\mathbf{210}_1$ to the notification manager 153, e.g., as illustrated and described herein in relation to FIG. 6.

It will be understood that methodologies 400 and 500 are exemplary only, and that any one of multiple background OS services $\mathbf{154}_1$ to $\mathbf{154}_N$ (or $\mathbf{174}_1$ to $\mathbf{174}_N$) may be a requesting background OS service that creates and transmits common notification data in a similar manner to any one or more of multiple notification user processes $\mathbf{152}_1$ to $\mathbf{152}_N$ via notification manager 153 to display a specified on-screen notification 210 to one or more of multiple users 1 to N in a similar manner.

FIG. 6 is a flow chart of methodology 600 showing return flow of notification display success or failure status through a software ecosystem (e.g., such as previously described in relation to block 416 of FIG. 4 and block 518 of FIG. 5) to a requesting OS Service $\mathbf{154}_1$ or $\mathbf{174}_1$ that originally requested display of an on-screen notification $\mathbf{210}_1$ according to one exemplary embodiment of the disclosed systems and methods. In this embodiment, a respective custom process plugin 302 is plugged-in to each respective notification user process 152 as previously illustrated and described in relation to FIGS. 3 and 5, although the same methodology 600 may be employed to embodiments that do not employ a respective custom process plugin 302 that is plugged-in to each respective notification user process 152 (e.g., such as illustrated and described in relation to FIG. 2).

Methodology 600 begins in block 602 where a designated notification user process $\mathbf{152}_1$ generates notification success or failure data that indicates whether or not the requested on-screen notification $\mathbf{210}_1$ was successfully displayed, and sends the notification success or failure data in a notification success or failure message with the unique notification ID corresponding to the requested on-screen notification $\mathbf{210}_1$ to notification manager 153. In block 604, notification manager 153 receives the notification success or failure message with the unique notification ID corresponding to the requested on-screen notification $\mathbf{210}_1$ from the designated notification user process $\mathbf{152}_1$. Upon receiving this notification success or failure message from the designated notification user process $\mathbf{152}_1$, notification manager 153 then in block 606 caches the notification display success or failure data (e.g., indicating success or failure of the display of on-screen notification $\mathbf{210}_1$) of this notification success or failure message to success or failure cache 262 of notification cache 133 on volatile system memory 120 and non-volatile storage 130, e.g., together with (associated with) the unique notification ID corresponding to the requested on-screen notification $\mathbf{210}_1$. In block 608, notification manager 153 removes the common notification data of the requesting background OS service $\mathbf{154}_1$ or $\mathbf{174}_1$ (e.g., which was cached in block 410 of FIG. 4 and block 510 of FIG. 5) from the common notification data cache 264 based on its associated unique notification ID corresponding to the requested on-screen notification $\mathbf{210}_1$ (e.g., which was generated in block 406 of FIG. 4 and block 506 of FIG. 5).

Next, in block 610, notification manager 153 attempts to send (e.g., pass) the notification success or failure data with the unique notification ID corresponding to the requested on-screen notification $\mathbf{210}_1$ to the requesting background OS service 154 or 174 (e.g., in this example $\mathbf{154}_1$ or $\mathbf{174}_1$) that originally requested display of the on-screen notification $\mathbf{210}_1$ to inform the requesting background OS service $\mathbf{154}_1$ or $\mathbf{174}_1$ if the request was successful or if it failed. In the event that the requesting background OS service $\mathbf{154}_1$ or $\mathbf{174}_1$ is not currently available (e.g., is not running) when notification manager 153 attempts to send the success or failure data in block 610, then after a predefined time period (e.g., such as one minute or any greater or lesser predefined time period) notification manager 153 retrieves the cached notification display success or failure data of block 606 from success or failure cache 262 and again attempts to send this notification display success or failure data with the unique notification ID corresponding to the requested on-screen notification $\mathbf{210}_1$ to the requesting background OS service 154 or 174 (e.g., in this example $\mathbf{154}_1$ or $\mathbf{174}_1$). In one embodiment, notification manager 153 may repeatedly retrieve this notification display success or failure data from success or failure cache 262 and attempt to send this notification display success or failure data with the unique notification ID corresponding to the requested on-screen notification $\mathbf{210}_1$ to the requesting background OS service $\mathbf{154}_1$ or $\mathbf{174}_1$ until the requesting background OS service $\mathbf{154}_1$ or $\mathbf{174}_1$ is currently available (e.g., currently running) to receive this notification display success or failure data.

In block 612 of FIG. 6, the requesting background OS service $\mathbf{154}_1$ or $\mathbf{174}_1$ receives the notification display success or failure data (on first attempt or later re-attempt) from notification manager 153. Once notification manager 153 receives acknowledgement that the requesting background OS service $\mathbf{154}_1$ or $\mathbf{174}_1$ has successfully received the notification display success or failure data in block 612 (e.g., by data receipt protocol), then in block 614 notification manager 153 responds by using the unique notification ID associated with notification display success or failure data in block 606 to identify this notification display success or failure data in success or failure cache 262, and removes this display success or failure data from success of failure cache 262.

In block 612, the requesting background OS service $\mathbf{154}_1$ or $\mathbf{174}_1$ receives the success or failure data sent in block 610 by notification manager 153. In block 614, notification manager 153 removes the cached notification display success or failure data for on-screen notification $\mathbf{210}_1$ (e.g., that was cached by notification manage 153 in block 606) from success or failure cache 262 of notification cache 133 that is maintained on volatile system memory 120 and nonvolatile storage 130 based on its associated unique notification ID (e.g., which was generated in block 406 of FIG. 4 and block 506 of FIG. 5).

Figure 7:
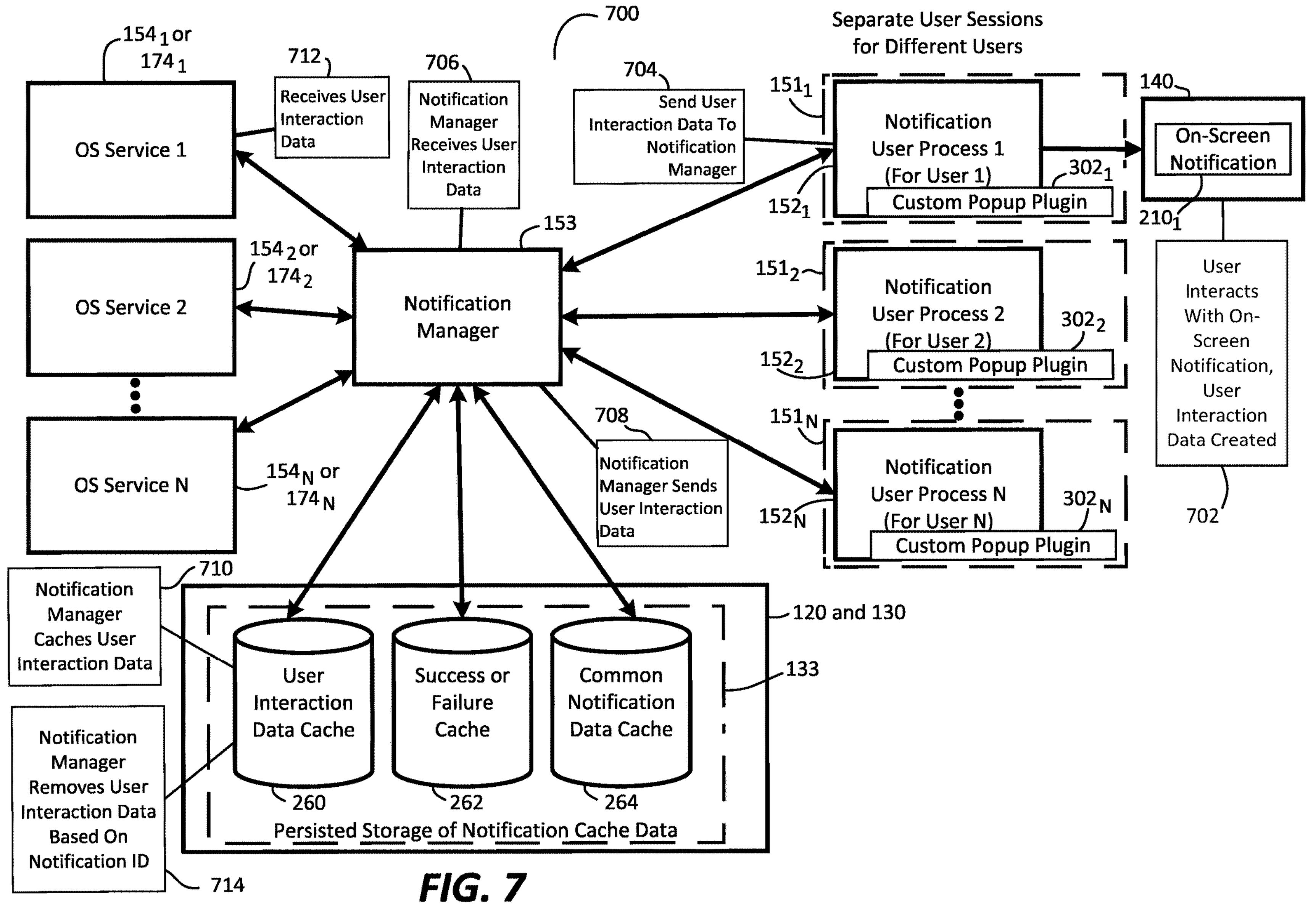
FIG. 7 illustrates methodology according to one exemplary embodiment of the disclosed systems and methods.

FIG. 7 is a flow chart of methodology 700 showing return flow of user interaction data for a displayed on-screen notification $\mathbf{210}_1$ through a software ecosystem (e.g., such as previously described in relation to block 416 of FIG. 4 and block 518 of FIG. 5) to a requesting OS Service $\mathbf{154}_1$ or $\mathbf{174}_1$ that originally requested display of the on-screen notification $\mathbf{210}_1$ according to one exemplary embodiment of the disclosed systems and methods. In this embodiment, a respective custom process plugin 302 is plugged-in to each respective notification user process 152 as previously illustrated and described in relation to FIGS. 3 and 5, although the same methodology 700 may be employed to embodiments that do not employ a respective custom process plugin 302 that is plugged-in to each respective notification user process 152 (e.g., such as illustrated and described in relation to FIG. 2).

Methodology 700 begins in block 702 where a requested on-screen notification $\mathbf{210}_1$ has been successfully displayed to a human user 1 on display device 140 (e.g., as illustrated and described in relation to FIG. 4 or FIG. 5). In this embodiment, on-screen notification $\mathbf{210}_1$ may include a graphical user interface (GUI) or other user interface display for accepting user input, e.g., such as two or more input buttons for accepting user click input, a single input button for accepting user click input, one or more check boxes for accepting user click input, a text box for accepting user text, etc.

In block 702 of methodology 700, user 1 interacts with the user interface of displayed on-screen notification $\mathbf{210}_1$ by providing user input to on-screen notification $\mathbf{210}_1$, e.g., by using external and/or integrated input/output (I/O) devices 170 to click on one or more displayed buttons of on-screen notification $\mathbf{210}_1$ and/or entering text into a displayed text box of on-screen notification $\mathbf{210}_1$. In block 704, the respective notification user process $\mathbf{152}_1$ reacts to the user input of block 702 by creating corresponding user interaction data that contains data representing the user input of block 702, and sends this created user interaction data with the unique notification ID corresponding to the requested on-screen notification $\mathbf{210}_1$ to notification manager 153.

In one embodiment, the created user interaction data of block 704 may be custom data that is unique to the on-screen notification $\mathbf{210}_1$ displayed solely by the designated notification user process $\mathbf{152}_1$ (e.g., such as illustrated and described in relation to the embodiment of FIG. 4), or that is displayed by the designated notification user process $\mathbf{152}_1$ according to a specified on-screen popup layout specified by custom popup data provided by custom popup plugin $\mathbf{302}_1$ (e.g., such as illustrated and described in relation to the embodiment of FIG. 5).

In one embodiment, the created user interaction data of block 704 may be a unique identifier (ID) that corresponds to selection of a displayed button of on-screen notification $\mathbf{210}_1$ that has been clicked on by user 1. For example, such a user-selected displayed button may be an "OK" button where multiple buttons are displayed by on-screen notification $\mathbf{210}_1$ for selection by user 1 (e.g., such as an "OK" button and a "Cancel" button). Where multiple buttons are so displayed to user 1 by on-screen notification $\mathbf{210}_1$, each different given displayed button may have its own different unique ID that is only included in the created user interaction data of block 704 if this given displayed button is selected by user 1 in block 702. In another embodiment, the created user interaction data may be (or correspond to) text input by user 1 into a text box that is part of the displayed on-screen notification $\mathbf{210}_1$, e.g., such as an on-screen notification $\mathbf{210}_1$ that is displayed by notification user process $\mathbf{152}_1$ as a custom popup that was created by custom popup plugin $\mathbf{302}_1$.

In block 706 of FIG. 7, notification manager 153 receives the user interaction data of block 704 with the unique notification ID corresponding to the requested on-screen notification $\mathbf{210}_1$, and in block 708 attempts to send (e.g., pass) this received user interaction data with the unique notification ID corresponding to the requested on-screen notification $\mathbf{210}_1$ to the requesting background OS service

154 or 174 (e.g., in this example $\mathbf{154}_1$ or $\mathbf{174}_1$) that originally requested display of the current on-screen notification $\mathbf{210}_1$ to provide the requesting background OS service $\mathbf{154}_1$ or $\mathbf{174}_1$ with the user input (e.g., user response) to the current on-screen notification $\mathbf{210}_1$. In the event that the requesting background OS service $\mathbf{154}_1$ or $\mathbf{174}_1$ is not currently available (e.g., is not running) when notification manager 153 attempts to send the user interaction data in block 708, then in block 710 notification manager 153 caches the user interaction data of block 708 (together with and associated with the unique notification ID corresponding to current on-screen notification $\mathbf{210}_1$) to user interaction data cache 260. In the case where the requesting background OS service $\mathbf{154}_1$ or $\mathbf{174}_1$ is not currently available in block 708, then after a predefined time period (e.g., such as one minute or any greater or lesser predefined time period) notification manager 153 retrieves the cached user interaction data of block 710 from user interaction data cache 260 and again attempts to send the user interaction data with the unique notification ID corresponding to the requested on-screen notification $\mathbf{210}_1$ to the requesting background OS service 154 or 174 (e.g., in this example $\mathbf{154}_1$ or $\mathbf{174}_1$). In one embodiment, notification manager 153 may repeatedly retrieve this user interaction data from user interaction data cache 260 and attempt to send the user interaction data with the unique notification ID corresponding to the requested on-screen notification $\mathbf{210}_1$ to the requesting background OS service $\mathbf{154}_1$ or $\mathbf{174}_1$ until the requesting background OS service $\mathbf{154}_1$ or $\mathbf{174}_1$ is currently available (e.g., currently running) to receive this user interaction data.

In block 712 of FIG. 7, the requesting background OS service $\mathbf{154}_1$ or $\mathbf{174}_1$ receives the user interaction data (on first attempt or later re-attempt) from notification manager 153. The requesting background OS service $\mathbf{154}_1$ or $\mathbf{174}_1$ then parses the received user interaction data to determine the content of the user input provided by user 1 in block 702 and responds accordingly, e.g., by initiating or terminating actions such as a virus scan action, a data retrieval action, a network data upload action, etc. Once notification manager 153 receives acknowledgement that the requesting background OS service $\mathbf{154}_1$ or $\mathbf{174}_1$ has successfully received the user interaction data in block 712 (e.g., by data receipt protocol), then in block 714 notification manager 153 responds by using the unique notification ID of user interaction data of block 708 to identify this user interaction data in user interaction data cache 260, and removes this user interaction data from user interaction data cache 260.

Figure 8:
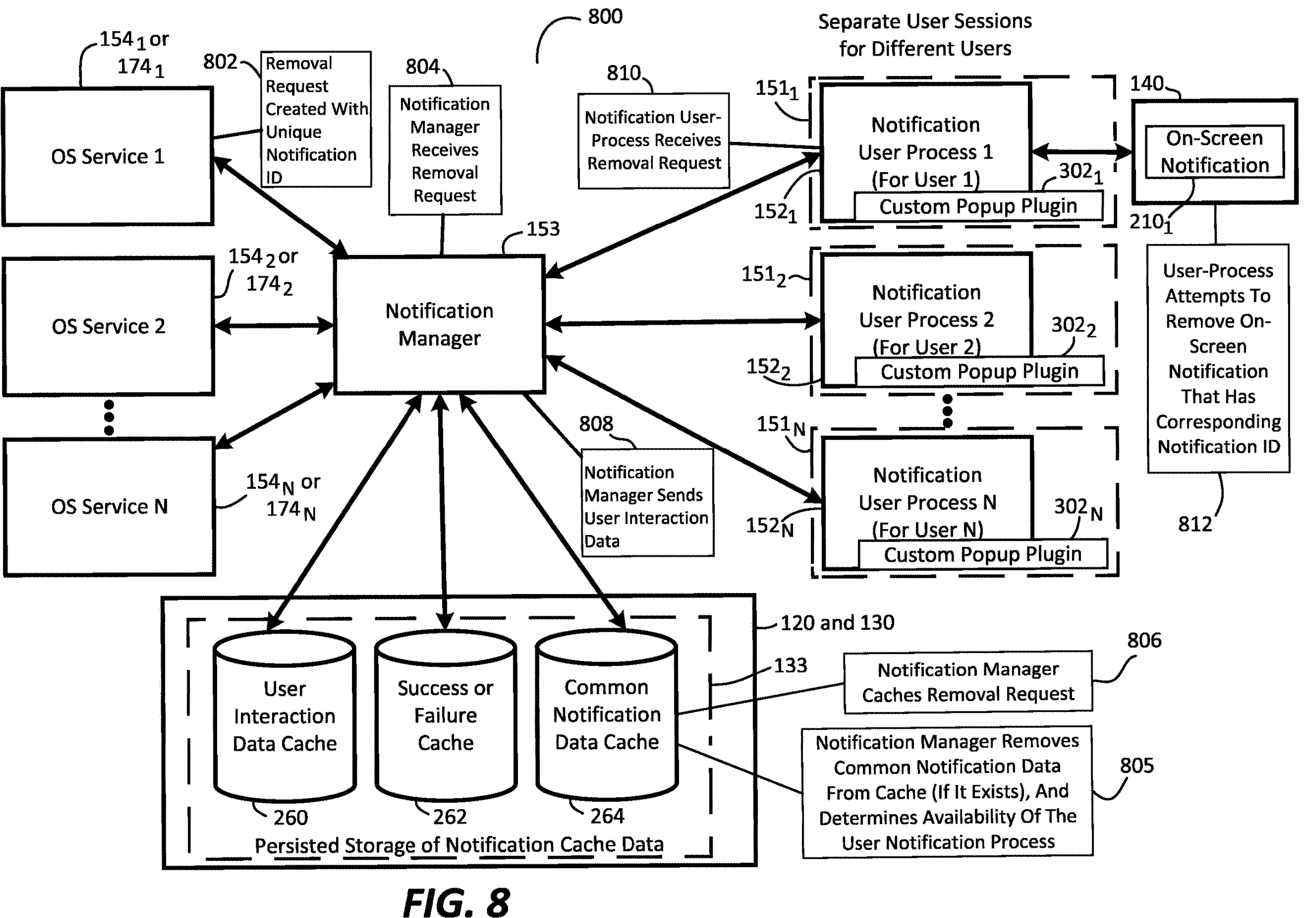
FIG. 8 illustrates methodology according to one exemplary embodiment of the disclosed systems and methods.

FIG. 8 is a flow chart of methodology 800 showing processing of a request for removal of an on-screen notification $\mathbf{210}_1$ through a software ecosystem (e.g., such as previously described in relation to block 416 of FIG. 4 and block 518 of FIG. 5) originated by a requesting OS Service $\mathbf{154}_1$ or $\mathbf{174}_1$ that originally requested display of the on-screen notification $\mathbf{210}_1$ according to one exemplary embodiment of the disclosed systems and methods. In this embodiment, a respective custom process plugin 302 is plugged-in to each respective notification user process 152 as previously illustrated and described in relation to FIGS. 3 and 5, although the same methodology 800 may be employed to embodiments that do not employ a respective custom process plugin 302 that is plugged-in to each respective notification user process 152 (e.g., such as illustrated and described in relation to FIG. 2).

In block 802 of methodology 800, a request for removal of a given on-screen notification $\mathbf{210}_1$ is created and sent to notification manager 153 by a requesting OS Service $\mathbf{154}_1$ or $\mathbf{174}_1$ that originally requested display of the given on-screen notification $\mathbf{210}_1$. This removal request of block 802 is created to include the unique notification identifier (ID) of the given on-screen notification $\mathbf{210}_1$ (e.g., which was generated in block 406 of FIG. 4 and block 506 of FIG. 5).

In block 804, notification manager 153 receives the request for removal of the given on-screen notification $\mathbf{210}_1$ with the unique notification ID of the given on-screen notification $\mathbf{210}_1$ that was sent to notification manager 153 in block 802. In block 805, notification manager 153 responds to this removal request by using the notification ID within the removal request to identify any cached common notification data stored in common notification data cache 264 for the given on-screen notification $\mathbf{210}_1$ (e.g., which was cached in block 410 of FIG. 4 or block 510 of FIG. 5), and then removes this cached common notification data for the given on-screen notification $\mathbf{210}_1$ (if it exists) from common notification data cache 264.

In the event that in block 805 notification manager finds that there is no cached common notification data stored in common notification data cache 264 for the given on-screen notification $\mathbf{210}_1$, then methodology 800 terminates (without sending a removal request message to notification user process $\mathbf{152}_1$) since this indicates that the given on-screen notification $\mathbf{210}_1$ is not currently displayed.

However, if in block 805 notification manager 153 finds that there is cached common notification data stored in common notification data cache 264 for the given on-screen notification $\mathbf{210}_1$, this indicates that the given on-screen notification $\mathbf{210}_1$ may still be currently displayed and methodology 800 continues. In this case, notification manager 153 then also determines in block 805 whether notification user process $\mathbf{152}_1$ that is displaying the given on-screen notification $\mathbf{210}_1$ is currently available (e.g., currently running or executing), e.g., by pinging or otherwise sending a status message to notification user process $\mathbf{152}_1$. For example, notification manager may determine in block 805 that notification user process $\mathbf{152}_1$ is currently available if a response to the status message is received from notification user process $\mathbf{152}_1$, and may determine that notification user process $\mathbf{152}_1$ not currently available if no response to the status message is received not currently available if no response to the status message is received from notification user process $\mathbf{152}_1$.

If notification manager 153 determines in block 805 that notification user process $\mathbf{152}_1$ is not currently available, then in block 806 notification manager stores and caches the removal request of block 802 in common notification data cache 264 (e.g., together with and associated with the unique notification ID provided within the removal request of block 802) for future use when the notification user process $\mathbf{152}_1$ becomes available. For example, any previously cached information (e.g., such as the removal request cached in block 806) that is intended for a previously unavailable user 1 session and its corresponding notification user process $\mathbf{152}_1$ may be provided to the given notification user process $\mathbf{152}_1$ with the unique notification ID corresponding to the requested on-screen notification $\mathbf{210}_1$ when it becomes available according to one embodiment of the disclosed systems and methods illustrated and described herein in relation to FIG. 13.

Once notification user process $\mathbf{152}_1$ is determined by notification manager 153 to be available (either immediately when notification user process $\mathbf{152}_1$ is determined to be currently available in block 805, or at a later time after notification user process $\mathbf{152}_1$ is determined not to be currently available in block 805), then in block 808 notification manager 153 sends a removal request message with the unique notification ID corresponding to the requested on-screen notification $210_1$ to the appropriate notification user process $152_1$ that corresponds to the given on-screen notification $210_1$. When notification user process $152_1$ is not initially available in block 805, notification manager 153 uses the unique notification ID of the removal request of block 802 to later retrieve the removal request of block 802 from common notification data cache 264 for sending in block 808 when notification user process $152_1$ becomes available.

In block 810 of methodology 800, notification user process $152_1$ receives the removal request with the unique notification ID corresponding to the requested on-screen notification $210_1$ sent in block 808 by notification manager 153. Then in block 812, notification user process $152_1$ responds to this removal request by attempting to remove the given on-screen notification $210_1$ (if it exists and is currently displayed). As illustrated and described further in relation to FIG. 9, upon success or failure by notification user process $152_1$ to remove the given on-screen notification $210_1$, a response may be sent through notification manager 153 with the unique notification ID corresponding to the requested on-screen notification $210_1$ to the requesting OS Service $154_1$ or $174_1$ that originally requested display of the given on-screen notification $210_1$, e.g., to inform this original requesting OS Service $154_1$ or $174_1$ whether the removal request was successful or not.

Figure 9:
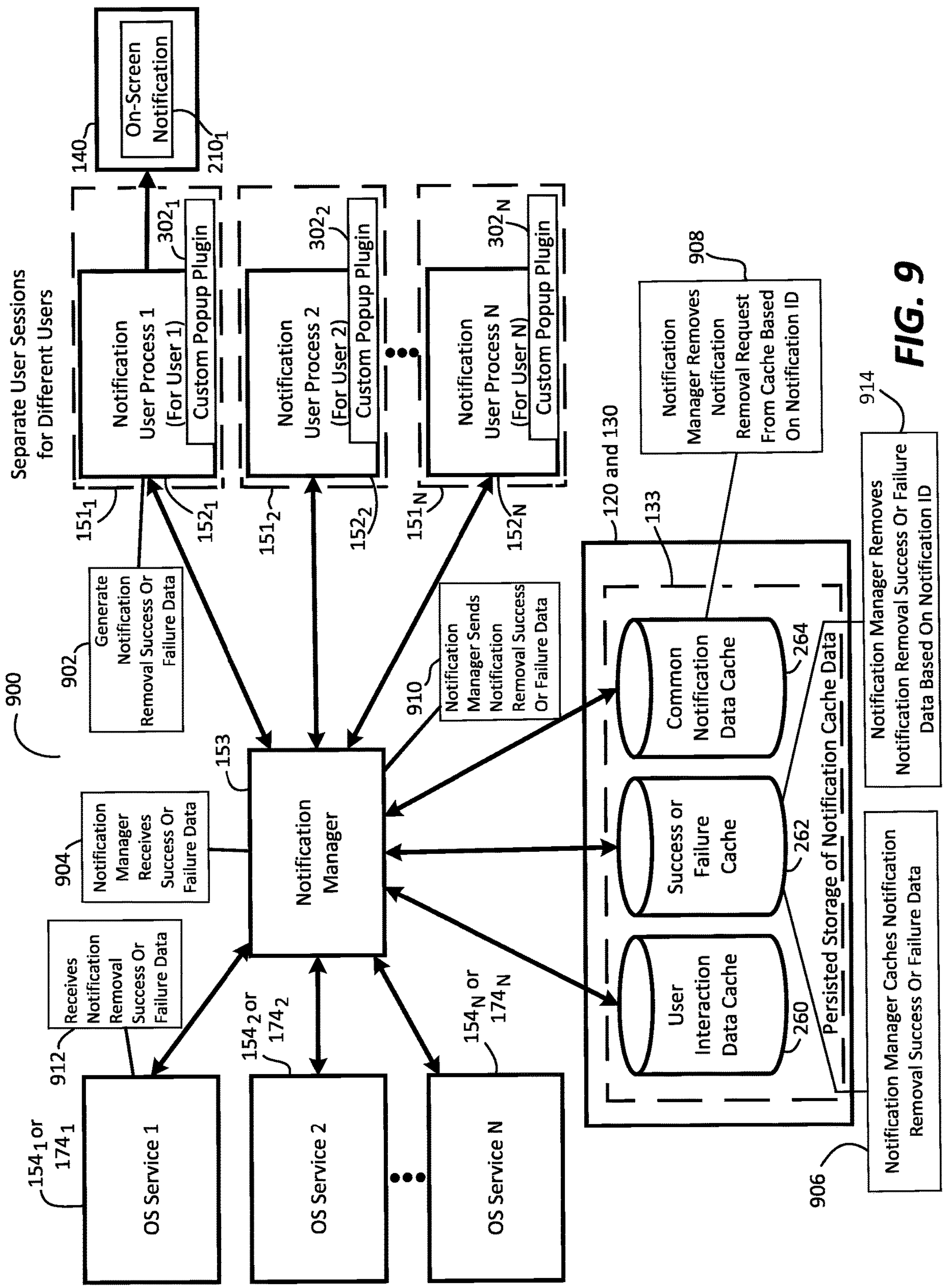
FIG. 9 illustrates methodology according to one exemplary embodiment of the disclosed systems and methods.

FIG. 9 is a flow chart of methodology 900 showing flow of notification removal success or failure data through a software ecosystem (e.g., such as previously described in relation to block 416 of FIG. 4 and block 518 of FIG. 5) after an attempted removal of an on-screen notification $210_1$ according to one exemplary embodiment of the disclosed systems and methods. In this embodiment, a respective custom process plugin 302 is plugged-in to each respective notification user process 152 as previously illustrated and described in relation to FIGS. 3 and 5, although the same methodology 900 may be employed to embodiments that do not employ a respective custom process plugin 302 that is plugged-in to each respective notification user process 152 (e.g., such as illustrated and described in relation to FIG. 2).

Methodology 900 starts at block 902 where notification user process $152_1$ creates or generates notification removal success or failure data based on whether or not user process $152_1$ successfully removed a displayed on-screen notification $210_1$, e.g., in block 812 of FIG. 8. This notification removal success or failure data of block 902 indicates whether or not the displayed on-screen notification $210_1$ was successfully removed. Also in block 902, user process $152_1$ sends this notification removal success or failure data (e.g., as a notification removal success or failure message) with the unique notification ID corresponding to the requested on-screen notification $210_1$ to notification manager 153.

In block 904 of methodology 900, notification manager 153 receives the notification removal success or failure data of block 902 with the unique notification ID corresponding to the requested on-screen notification $210_1$ from notification user process $152_1$. In block 906, notification manager 153 caches this notification removal success or failure data of block 902 in success of failure cache 262 (e.g., together with and associated with the unique notification ID corresponding to the given on-screen notification $210_1$). In block 908, notification manager uses the notification ID corresponding to the given on-screen notification $210_1$ to identify and then remove any cached removal request (e.g., that was cached in block 802 of FIG. 8) from common notification data cache 264.

In block 910 of methodology 900, notification manager 153 sends the notification removal success or failure data of block 902 with the unique notification ID corresponding to the requested on-screen notification $210_1$ to the requesting background OS Service $154_1$ or $174_1$ that originally requested display of the given on-screen notification $210_1$. In one embodiment, when the requesting background OS Service $154_1$ or $174_1$ is initially unavailable, notification manager 153 may repeatedly retrieve this notification removal success or failure data from success of failure cache 262 and attempt to send this notification removal success or failure data to the requesting background OS service $154_1$ or $174_1$ until the requesting background OS service $154_1$ or $174_1$ is currently available (e.g., currently running) to receive this update success or failure data.

In block 912, the original requesting OS Service $154_1$ or $174_1$ receives this notification removal success or failure data of block 902 with the unique notification ID corresponding to the requested on-screen notification $210_1$ from notification manager 153. Once notification manager 153 receives acknowledgement that the original requesting background OS service $154_1$ or $174_1$ has successfully received this notification removal success or failure data of block 902 in block 912 (e.g., by data receipt protocol), then in block 914 notification manager 153 responds by using the unique notification ID corresponding to the given on-screen notification $210_1$ to identify and remove its respective notification removal success or failure data from success of failure cache 262 (i.e., that was previously cached in block 906 of methodology 900).

Figure 10:
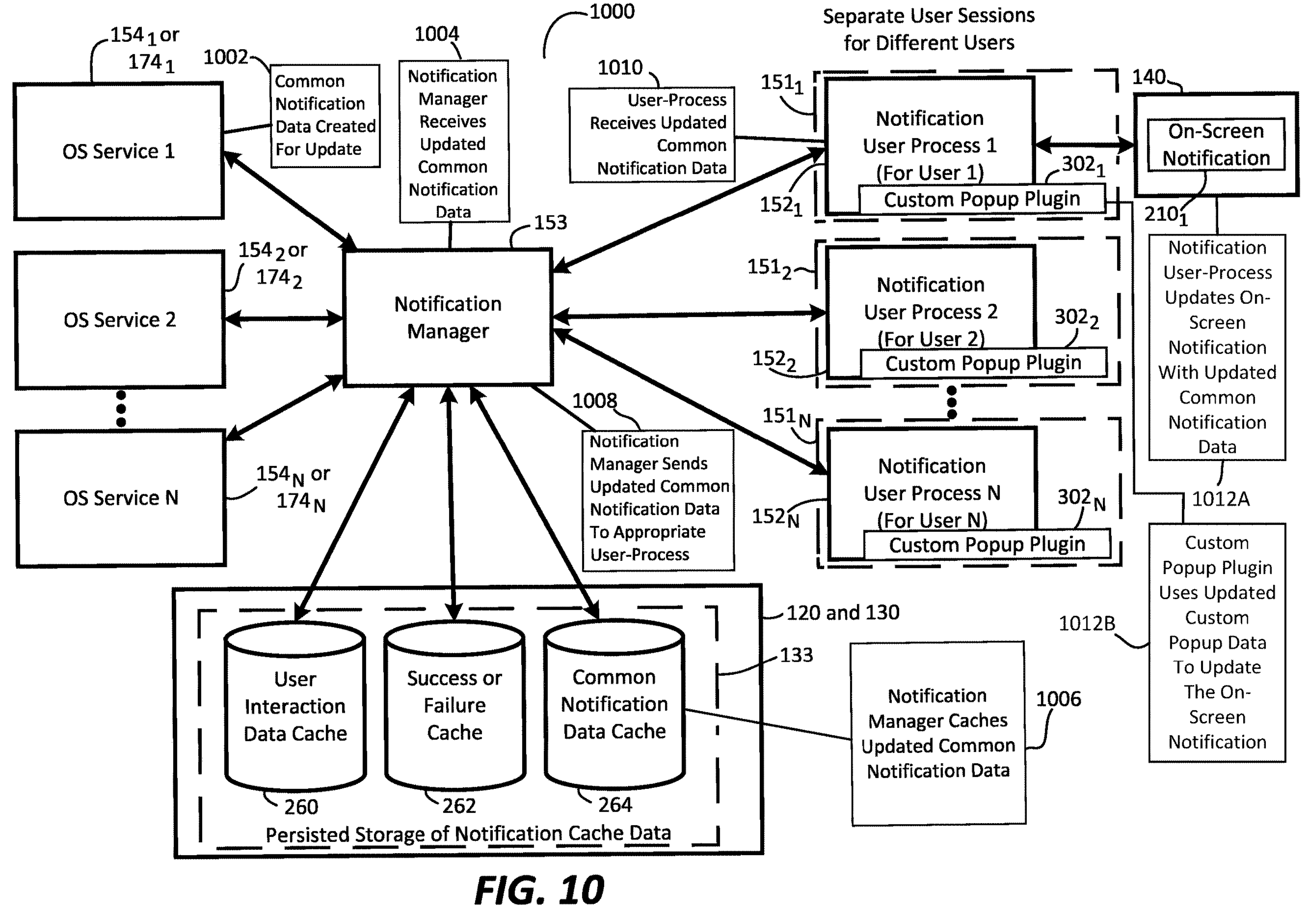
FIG. 10 illustrates methodology according to one exemplary embodiment of the disclosed systems and methods.

FIG. 10 is a flow chart of methodology 1000 showing processing of a request for update of a displayed on-screen notification $210_1$ through a software ecosystem (e.g., such as previously described in relation to block 416 of FIG. 4 and block 518 of FIG. 5) originated by a requesting OS Service $154_1$ or $174_1$ that originally requested display of the on-screen notification $210_1$ according to one exemplary embodiment of the disclosed systems and methods. In this embodiment, a respective custom process plugin 302 is plugged-in to each respective notification user process 152 as previously illustrated and described in relation to FIGS. 3 and 5, although the same methodology 1000 may be employed to embodiments that do not employ a respective custom process plugin 302 that is plugged-in to each respective notification user process 152 (e.g., such as illustrated and described in relation to FIG. 2).

In block 1002 of methodology 1000, updated common notification data for a given displayed on-screen notification $210_1$ is created and sent as a notification update request to notification manager 153 by a requesting background OS service $154_1$ or $174_1$ that originally requested display of the given on-screen notification $210_1$. If the given displayed on-screen notification $210_1$ is an on-screen popup that was originally created by common notification data including custom popup data (e.g., as illustrated and described in relation to FIG. 5), then the updated common notification data also includes updated custom popup data. In any case, the updated common notification data of block 1002 is created to include the unique notification identifier (ID) of the given on-screen notification $210_1$ (e.g., which was generated in block 406 of FIG. 4 and block 506 of FIG. 5) This updated common notification data may include changes to the user interface of the given displayed on-screen notification $210_1$, e.g., such as a change in the displayed text of on-screen notification $210_1$, a change to a displayed variable of on-screen notification $210_1$ (such as change in the displayed percentage completion from "Encryption progress 45%" to "Encryption progress 46%", etc. In block 1002, the requesting OS Service $154_1$ or $174_1$ sends the unique notification ID of the given on-screen notification $210_1$ along with the updated common notification data to the notification manager 153.

In block 1004 of methodology 1000, notification manager 153 receives the updated common notification data and unique notification ID for the given displayed on-screen notification $210_1$ that was sent to notification manager 153 in block 1002. In block 1004, notification manager 153 responds to receipt of this updated common notification data by determining whether notification user process $152_1$ that is displaying the given on-screen notification $210_1$ is currently available (e.g., currently running or executing), e.g., by pinging or otherwise sending a status message to notification user process $152_1$. For example, notification manager may determine in block 1004 that notification user process $152_1$ is currently available if a response to the status message is received from notification user process $152_1$, and may determine that notification user process $152_1$ is not currently available if no response to the status message is received not currently available if no response to the status message is received from notification user process $152_1$.

If notification manager 153 determines in block 1004 that notification user process $152_1$ is not currently available, then in block 1006 notification manager then stores and caches the updated common notification data of block 1002 in common notification data cache 264 (e.g., together with and associated with the notification ID provided with the updated common notification data of block 1002) until notification user process $152_1$ is available, i.e., for future use when the notification user process $152_1$ becomes available. For example, any previously cached information (e.g., such as the updated common notification data cached in block 1006) that is intended for a previously unavailable user 1 session and its corresponding notification user process $152_1$ may be provided to the given notification user process $152_1$ when it becomes available according to one embodiment of the disclosed systems and methods illustrated and described herein in relation to FIG. 13.

Once notification user process $152_1$ is determined by notification manager 153 to be available (either immediately when notification user process $152_1$ is determined to be currently available in block 1004, or at a later time after notification user process $152_1$ is determined not to be currently available in block 1004), then in block 1008 notification manager 153 sends the updated common notification data of block 1002 with the unique notification ID of the given on-screen notification $210_1$ to the appropriate notification user process $152_1$ that corresponds to the given on-screen notification $210_1$. When notification user process $152_1$ is not initially available in block 1005, notification manager 153 uses the notification ID of the updated common notification data of block 1002 to later retrieve the updated common notification data of block 1002 from common notification data cache 264 for sending in block 1008 when notification user process $152_1$ becomes available.

In block 1010 of methodology 1000, notification user process $152_1$ receives the updated common notification data and unique notification ID of the given on-screen notification $210_1$ sent in block 1008 by notification manager 153. Then, in either block 1012A or 1012B, notification user process $152_1$ responds to this updated common notification data by attempting to update the given on-screen notification $210_1$ (if it exists and is currently displayed) as described further below.

Assuming that the given on-screen notification $210_1$ was originally created by common notification data without custom popup data (e.g., as illustrated and described in relation to FIG. 4), then the updated common notification data received by notification user process $152_1$ in block 1010 does not include custom popup data. In this embodiment, notification user process $152_1$ automatically updates and displays the given on-screen notification $210_1$ in block 1012A with changes made to the user interface of given displayed on-screen notification $210_1$ that are specified by the received updated common notification data.

In an alternative embodiment, if the given on-screen notification $210_1$ is an on-screen popup that was originally created by common notification data includes custom popup data (e.g., as illustrated and described in relation to FIG. 5), then the updated common notification data received by notification user process $152_1$ in block 1010 also includes updated custom popup data. In this case, in block 1010 notification user process $152_1$ also finds the custom popup plugin $302_1$ that is plugged-in to notification user process $152_1$, and requests that the custom popup plugin $302_1$ use the updated custom popup data to update the user interface of the on-screen popup of the given on-screen notification $210_1$. In this embodiment, custom popup plugin $302_1$ responds to this request in block 1012B by using the updated custom popup data to update the user interface of the on-screen popup of the given on-screen notification $210_1$ with changes made to the user interface (e.g., changes to the on-screen popup look and feel) of the given displayed on-screen notification $210_1$ that are specified by the updated custom popup data.

Figure 11:
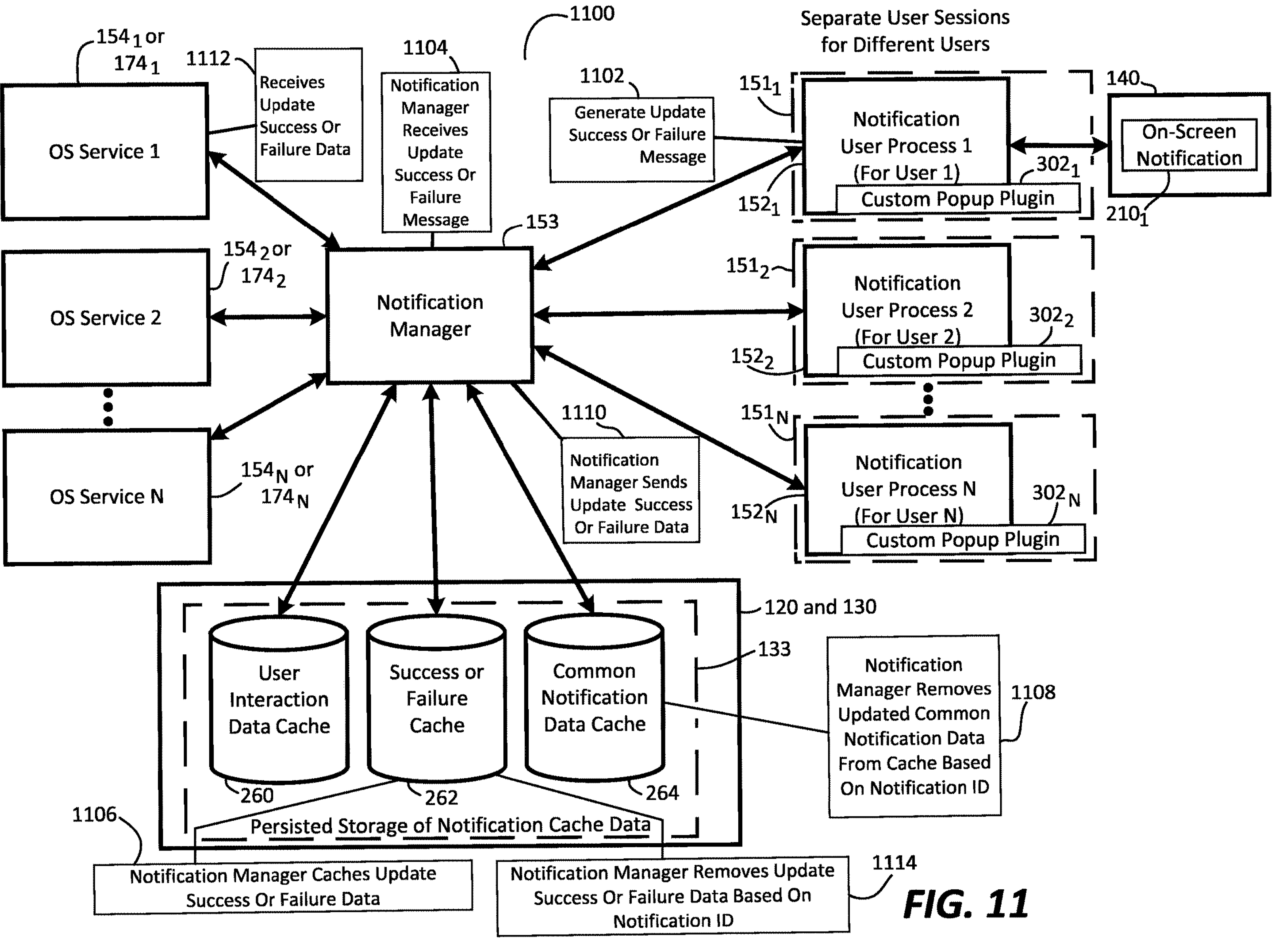
FIG. 11 illustrates methodology according to one exemplary embodiment of the disclosed systems and methods.

As illustrated and described further in relation to FIG. 11, upon success or failure of updating the given on-screen notification $210_1$ in either block 1012A or 1012B, notification user process $152_1$ sends a corresponding update success or failure message with the unique notification ID corresponding to the requested on-screen notification $210_1$ to notification manager 153, and notification manager responds by sending a corresponding update success or failure response with the unique notification ID corresponding to the requested on-screen notification $210_1$ to the requesting background OS Service $154_1$ or $174_1$ that originally requested display of the given on-screen notification $210_1$, e.g., to inform this original requesting OS Service $154_1$ or $174_1$ whether the update of the given on-screen notification $210_1$ was successful or not.

FIG. 11 is a flow chart of methodology 1100 showing return flow of update success or failure status for update of a given on-screen notification $210_1$ through a software ecosystem (e.g., such as previously described in relation to block 416 of FIG. 4 and block 518 of FIG. 5) to a requesting OS Service $154_1$ or $174_1$ that originally requested display of the given on-screen notification $210_1$ according to one exemplary embodiment of the disclosed systems and methods. In this embodiment, a respective custom process plugin 302 is plugged-in to each respective notification user process 152 as previously illustrated and described in relation to FIGS. 3 and 5, although the same methodology 1100 may be employed to embodiments that do not employ a respective custom process plugin 302 that is plugged-in to each respective notification user process 152 (e.g., such as illustrated and described in relation to FIG. 2).

Methodology 1100 begins in block 1102 where notification user process $152_1$ generates update success or failure data (e.g., in this case as an update success or failure message) for the given on-screen notification $210_1$, and sends the update success or failure message to notification manager 153 with the unique notification ID of the given on-screen notification $\mathbf{210}_1$. In block 1104, notification manager 153 receives the update success or failure data of the update success or failure message with the unique notification ID of the given on-screen notification $\mathbf{210}_1$ from notification user process $\mathbf{152}_1$. Upon receiving this update success or failure message from notification user process $\mathbf{152}_1$, notification manager 153 then in block 1106 caches the update success or failure data (e.g., indicating success or failure of the update to on-screen notification $\mathbf{210}_1$) of this update success or failure message to success or failure cache 262 (together with and associated with its corresponding unique notification ID). In block 1108, notification manager 153 finds and removes the common notification data of the requesting background OS service $\mathbf{154}_1$ or $\mathbf{174}_1$ (e.g., which was cached in block 410 of FIG. 4 and block 510 of FIG. 5) from the common notification data cache 264 based on its associated unique notification ID (e.g., which was generated in block 406 of FIG. 4 and block 506 of FIG. 5).

Next, in block 1110, notification manager 153 attempts to send (e.g., pass) the update success or failure data with the unique notification ID corresponding to the requested on-screen notification $\mathbf{210}_1$ to the requesting background OS service 154 or 174 (e.g., in this example $\mathbf{154}_1$ or $\mathbf{174}_1$) that originally requested display of the on-screen notification $\mathbf{210}_1$ to inform this requesting background OS service $\mathbf{154}_1$ or $\mathbf{174}_1$ if the update request was successful or if it failed. In the event that the requesting background OS service $\mathbf{154}_1$ or $\mathbf{174}_1$ is not currently available in block 1110, then after a predefined time period (e.g., such as one minute or any greater or lesser predefined time period) notification manager 153 retrieves the cached update success or failure data of block 1106 from the success or failure cache 262 and again attempts to send this update success or failure data to the requesting background OS service $\mathbf{154}_1$ or $\mathbf{174}_1$. In one embodiment, notification manager 153 may repeatedly retrieve and attempt to send the update success or failure data with the unique notification ID corresponding to the requested on-screen notification $\mathbf{210}_1$ to the requesting background OS service $\mathbf{154}_1$ or $\mathbf{174}_1$ until the requesting background OS service $\mathbf{154}_1$ or $\mathbf{174}_1$ is currently available (e.g., currently running) to receive this update success or failure data. In block 1112, the requesting background OS service $\mathbf{154}_1$ or $\mathbf{174}_1$ receives the update success or failure data with the unique notification ID corresponding to the requested on-screen notification $\mathbf{210}_1$ (on first attempt or later re-attempt) from notification manager 153.

FIG. 12 is a flow chart of methodology 1200 showing how a given requesting background OS service $\mathbf{154}_1$ or $\mathbf{174}_1$ may initiate and achieve removal from common notification data cache 264 of cached common notification data corresponding to an un-displayed on-screen notification $\mathbf{210}_1$ that was originally requested by the given requesting background OS service $\mathbf{154}_1$ or $\mathbf{174}_1$ (e.g., such as previously described in relation to block 402 of FIG. 4 and block 502 of FIG. 5). In the embodiment of FIG. 12, the common notification data corresponding to the un-displayed on-screen notification $\mathbf{210}_1$ has not yet been displayed on display device 140 by the designated notification user process $\mathbf{152}_1$ because the notification manager 153 has not yet successfully sent the common notification data to the designated notification user process $\mathbf{152}_1$, e.g., such as when the notification manager 153 has not yet had time to send the common notification data to the designated notification user process $\mathbf{152}_1$, or when the designated notification user process $\mathbf{152}_1$ is not running or otherwise available to receive the common notification data. In this embodiment, a respective custom process plugin 302 is plugged-in to each respective notification user process 152 as previously illustrated and described in relation to FIGS. 3 and 5, although the same methodology 1200 may be employed to embodiments that do not employ a respective custom process plugin 302 that is plugged-in to each respective notification user process 152 (e.g., such as illustrated and described in relation to FIG. 2).

Methodology 1200 of FIG. 12 starts in block 1202 where the given requesting background OS service $\mathbf{154}_1$ or $\mathbf{174}_1$ creates a cache data removal request for the previously cached common notification data corresponding to the un-displayed on-screen notification $\mathbf{210}_1$ (e.g., that was cached as previously described in relation to block 410 of FIG. 4 and block 510 of FIG. 5). This previously cached common notification data includes the unique notification ID originally created by notification manager 153 to correspond to the un-displayed on-screen notification $\mathbf{210}_1$ (e.g., such as previously described in relation to block 404 of FIG. 4 and block 504 of FIG. 5). In block 1202, the given requesting background OS service $\mathbf{154}_1$ or $\mathbf{174}_1$ also sends the cache data removal request with the unique notification ID corresponding to the requested on-screen notification $\mathbf{210}_1$ to notification manager 153.

In block 1204 of methodology 1200, notification manager 153 receives the cache data removal request with the unique notification ID corresponding to the requested on-screen notification $\mathbf{210}_1$ from the given requesting background OS service $\mathbf{154}_1$ or $\mathbf{174}_1$. In block 1206, notification manager 153 responds to this received cache data removal request by finding and removing all cached common notification data from common notification data cache 264 that matches the unique notification ID that was included in the cache data removal request. Then, in block 1208, notification manager 153 creates and stores cache data removal success or failure data in success or failure cache 262 with the unique notification ID corresponding to the un-displayed on-screen notification $\mathbf{210}_1$, e.g., for future transmittal to the given requesting background OS service $\mathbf{154}_1$ or $\mathbf{174}_1$ in the event that the given requesting background OS service $\mathbf{154}_1$ or $\mathbf{174}_1$ is currently not available in a similar manner as described in relation to block 610 of FIG. 6.

The cache data removal success or failure data of block 1208 indicates whether or not the previously cached common notification data (i.e., corresponding to the unique notification ID that was included in the cache data removal request) was successfully found and removed in block 1206 from common notification data cache 264. In this regard, removal of the cached common notification data may fail, for example, where sufficient time has elapsed for on-screen notification $\mathbf{210}_1$ to be displayed and its cached common notification data has already been removed from common notification data cache 264 (e.g., as previously described in relation to block 608 of FIG. 6).

In block 1210 of methodology 1200, notification manager 153 sends the cache data removal success or failure data with the unique notification ID corresponding to the un-displayed on-screen notification $\mathbf{210}_1$ to the given requesting background OS service $\mathbf{154}_1$ or $\mathbf{174}_1$. In block 1212, the given requesting background OS service $\mathbf{154}_1$ or $\mathbf{174}_1$ receives this cache data removal success or failure data with the unique notification ID corresponding to the requested on-screen notification $\mathbf{210}_1$ (on first attempt or later re-attempt) from notification manager 153. Once notification manager 153 receives acknowledgement that the requesting background OS service $\mathbf{154}_1$ or $\mathbf{174}_1$ has successfully received the cache data removal success or failure data in block 1212 (e.g., by data receipt protocol), then in block 1214 notification manager 153 responds by removing the cache data removal success or failure data matching the unique notification ID corresponding to the un-displayed on-screen notification $210_1$.

FIG. 13 is a flow chart of methodology 1300 showing how any previously cached information intended for a previously unavailable user session and its corresponding notification user process 152 (e.g., notification user process $152_N$ in this example) may be provided to the given notification user process $152_N$ when it becomes available according to one embodiment of the disclosed systems and methods. In this regard, a given notification user process $152_N$ may be unavailable when no user session currently exists for user N, and the given notification user process $152_N$ may then later become available when a new user session is started for user N. Examples of such previously cached information intended for the given user session and its corresponding notification user process $152_N$ may include, for example, previously cached common notification data (e.g., that was cached in block 410 of FIG. 4 and block 510 of FIG. 5), previously cached updated common notification data (e.g., that was cached in block 1006 of FIG. 10), and/or previously cached removal request (e.g., that was cached in block 805 of FIG. 8). In this embodiment of FIG. 13, a respective custom process plugin 302 is shown plugged-in to each respective notification user process 152 as previously illustrated and described in relation to FIGS. 3 and 5, although the same methodology 1300 may be employed to embodiments that do not employ a respective custom process plugin 302 that is plugged-in to each respective notification user process 152 (e.g., such as illustrated and described in relation to FIG. 2).

Methodology 1300 begins in block 1302, where a new notification user process $152_N$ is started by OS 101 of information handling system 100 when a corresponding new user session for user N is initiated on information handling system 100 by user N, e.g., such as when user N logs in from a non-logged in state. In this case, notification user process $152_N$ has been previously inactive prior to block 1302. Next, in block 1304, notification user process $152_N$ sends a cached information request that asks notification manager 153 to provide any previously cached information that is currently maintained in notification cache 133 and that is intended for (and associated with) the new user session and its corresponding notification user process $152_N$. This request for information of block 1304 may include session-identifying information that uniquely identifies the new user session for user N, e.g., such as Microsoft Windows user security identifier (SID) for user N, user N's unique username that they use to log into the OS (e.g., JohnDoe), Linux user identifier (UID) for user N, etc.

In block 1306, notification manager 153 receives the request for cached information and session-identifying information that was sent in block 1304 by notification user process $152_N$. In block 1308, notification manager 153 then responds to this request by using the included session-identifying information to find and retrieve any previously cached information intended for the new user session and its corresponding notification user process $152_N$ that is currently maintained in notification cache 133. Then, in block 1310, notification manager 153 sends the retrieved cached information to notification user process $152_N$ that corresponds to the new user session for user N, and notification user process $152_N$ then receives and processes this retrieved cached information in block 1312.

As an example, in one embodiment of block 1308, notification manager 153 may perform a dictionary lookup in notification cache 133 based on the session-identifying information for user N (e.g., such as SID or UID) from block 1304. In this regard, the notification manager 153 may filter all records (e.g., such as 1000 records) contained in the dictionary or database of notification cache 133 to find only those records (e.g., such as 50 records) in notification cache 133 that belong to the session corresponding to the session-identifying information of user N. These records of the session corresponding to user N may then in turn be further filtered by notification manager 153 based on the specific unique notification ID of a given notification 210 to find only those entries (e.g., such as 3 entries) in notification cache 133 that are specific to the specific notification 210.

In one embodiment, where there are multiple different items of previously cached information intended for the given notification user process $152_N$, (e.g., such as separate display, removal, and/or update requests) that are maintained in notification cache 133, notification manager 153 may send these items separately and one at a time in block 1310 to notification user process $152_N$ that corresponds to the new user session for user N. As previously described, examples of such items of previously cached information include, for example, previously cached common notification data (e.g., that was cached in block 410 of FIG. 4 and block 510 of FIG. 5), previously cached updated common notification data (e.g., that was cached in block 1006 of FIG. 10), and/or previously cached removal request (e.g., that was cached in block 805 of FIG. 8).

It will be understood that the example methodologies of FIGS. 4 to 13 herein are exemplary only, and that any other combination of additional, fewer and/or alternative steps may be employed that is suitable for accomplishing the task/s and/or achieving the purpose/s of the corresponding methodology of each of FIGS. 4 to 13.

It will also be understood that one or more of the tasks, functions, or methodologies described herein (e.g., including those described herein for components 101, 102, 110, 120, 125, 130, 140, 151, 152, 154, 160, 163, 166, 170, 171, 174, 175, 180, 181, 183, 190, 191, etc.) may each be implemented by circuitry and/or by a computer program of instructions (e.g., computer readable code such as firmware code or software code) embodied in a non-transitory tangible computer readable medium (e.g., optical disk, magnetic disk, non-volatile memory device, etc.), in which the computer program includes instructions that are configured when executed on a processing device in the form of a programmable integrated circuit (e.g., processor such as CPU, controller, microcontroller, microprocessor, ASIC, etc. or programmable logic device "PLD" such as FPGA, complex programmable logic device "CPLD", etc.) to perform one or more steps of the methodologies disclosed herein. In one embodiment, a group of such processing devices may be selected from the group consisting of CPU, controller, microcontroller, microprocessor, FPGA, CPLD and ASIC. The computer program of instructions may include an ordered listing of executable instructions for implementing logical functions in an processing system or component thereof. The executable instructions may include a plurality of code segments operable to instruct components of an processing system to perform the methodologies disclosed herein.

It will also be understood that one or more steps of the present methodologies may be employed in one or more code segments of the computer program. For example, a code segment executed by the information handling system may include one or more steps of the disclosed methodologies. It will be understood that a processing device may be configured to execute or otherwise be programmed with software, firmware, logic, and/or other program instructions stored in one or more non-transitory tangible computer-readable mediums (e.g., data storage devices, flash memories, random update memories, read only memories, programmable memory devices, reprogrammable storage devices, hard drives, floppy disks, DVDs, CD-ROMs, and/or any other tangible data storage mediums) to perform the operations, tasks, functions, or actions described herein for the disclosed embodiments.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touch screen and/or a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. A method, comprising using at least one programmable integrated circuit of an information handling system to:
- execute one or more notification user processes within different respective user application spaces on the information handling system;
- execute a notification manager process in communication with each of the notification user processes and with multiple different background operating system (OS) services; and
- execute the notification manager process to:
  - receive a first notification request including first common notification data specifying a first desired common on-screen notification layout from a first one of the multiple different background OS services, the first common notification data designating at least one of the notification user processes and specifying a first requested on-screen notification for display to a user in the user application space of the designated notification user process,
  - assign a first unique identifier to the first requested on-screen notification and provide the first unique identifier to the first one of the multiple different background OS services,
  - find the at least one notification user process designated by the first common notification data, and
  - send the received first common notification data with the first unique identifier of the first requested on-screen notification to the designated notification user process;
- execute the designated notification user process to attempt to display the specified first requested on-screen notification to a user on a display device of the information handling system and in the user application space of the designated notification user process;
- execute the notification manager process to:
  - receive a notification update request including updated common notification data for the first requested on-screen notification with the first unique identifier of the first requested on-screen notification from the first one of the multiple different background OS services, and
  - send the updated common notification data with the first unique identifier of the first requested on-screen notification to the designated notification user process; and
- execute the designated notification user process to receive and respond to the updated common notification data by attempting to update the first requested onscreen notification if it is currently displayed on the display device of the information handling system in the user application space of the designated notification user process.

2. The method of claim 1, where the information handling system is a local information handling system that is coupled by a network to a remote information handling system; where the first one of the multiple different background OS services is executing on the remote information handling system; and where the method further comprises using the at least one programmable integrated circuit of the local information handling system to execute the notification manager process to receive the first notification request and first common notification data across the network from the first one of the multiple different background OS services executing on the remote information handling system.

3. The method of claim 1, where the first one of the multiple different background OS services is executing on the same at least one programmable integrated circuit of the information handling system that executes the notification manager process.

4. The method of claim 1, further comprising using the at least one programmable integrated circuit of the information handling system to:
- execute the notification manager process to:
  - store the first common notification data with the first unique identifier of the first requested on-screen notification in a notification cache maintained on at least one of non-volatile memory or volatile memory of the information handling system, and
  - then, if the designated notification user process is not initially available, later retrieve the first common notification data from the notification cache and send the retrieved first common notification data with the first unique identifier of the first requested on-screen notification to the designated notification user process when the designated notification user process is available to successfully receive the first common notification data.

5. The method of claim 4, further comprising using the at least one programmable integrated circuit of the information handling system to:

execute the notification manager process to:

store the first common notification data with the first unique identifier of the first requested on-screen notification in a notification cache maintained on at least one of non-volatile memory or volatile memory of the information handling system, and then receive a request for removing the cached first common notification data from the notification cache with the first unique identifier of the first requested on-screen notification from the first one of the multiple different background OS services, then remove the cached first common notification data from the notification cache, and then send cache data removal success data with the first unique identifier of the first requested on-screen notification to the first one of the multiple different background OS services if the attempt to remove the cached first common notification data from the notification cache succeeds, or then send cache data removal failure data with the first unique identifier of the first requested on-screen notification to the first one of the multiple different background OS services if the attempt to remove the cached first common notification data from the notification cache fails.

6. The method of claim 4, where the designated notification user process is inactive and unavailable to receive the first common notification data with the first unique identifier of the first requested on-screen notification when the notification manager process receives the first notification request including the first common notification data from the first one of the multiple different background OS services; and where the method further comprises then using the at least one programmable integrated circuit of the information handling system to:

execute the notification manager process to:

receive a cached information request from the designated notification user process when the designated notification user process becomes active and available, the cached information request asking for any cached information intended for the designated notification user process, and respond to the received cached information request by retrieving the first common notification data from the notification cache and sending the retrieved first common notification data with the first unique identifier of the first requested on-screen notification to the designated notification user process.

7. The method of claim 1, further comprising using the at least one programmable integrated circuit of the information handling system to:

execute the designated notification user process to:

send notification display success data with the first unique identifier of the first requested on-screen notification to the notification manager process if the attempt to display the first requested on-screen notification succeeds, and send notification display failure data with the first unique identifier of the first requested on-screen notification to the notification manager process if the attempt to display the first requested on-screen notification fails; and execute the notification manager process to:

receive either of the notification display success data or notification display failure data with the first unique identifier of the first requested on-screen notification from the designated notification user process, store the received notification display success data or notification display failure data with the first unique identifier of the first requested on-screen notification in a notification cache maintained on at least one of non-volatile memory or volatile memory of the information handling system, attempt to send the received notification display success data or notification display failure data with the first unique identifier of the first requested on-screen notification to the first one of the multiple different background OS services, and upon failure of the attempt to send the received notification display success data or notification display failure data to the first one of the multiple different background OS services, then repeatedly retrieve the notification display success data or notification display failure data from the notification cache and attempt to send this retrieved notification display success data or notification display failure data with the first unique identifier of the first requested on-screen notification to the first one of the multiple different background OS services until the first one of the multiple different background OS services is available to successfully receive the notification display success data or notification display failure data.

8. The method of claim 1, further comprising using the at least one programmable integrated circuit of the local information handling system to:

execute the designated notification user process to:

display the first requested on-screen notification to the user on the display device of the information handling system and in the user application space of the designated notification user process, the displayed on-screen notification including a user interface display configured to accept input from the user, receive user input provided from the user via the user interface display, create user interaction data that comprises data corresponding to the user input, and send the user interaction data with the first unique identifier of the first requested on-screen notification to the notification manager process: and execute the notification manager process to:

receive the user interaction data with the first unique identifier of the first requested on-screen notification from the designated notification user process, attempt to send the user interaction data with the first unique identifier of the first requested on-screen notification to the first one of the multiple different background OS services, store the user interaction data with the first unique identifier of the first requested on-screen notification in a notification cache maintained on at least one of non-volatile memory or volatile memory of the information handling system, and upon failure of the attempt to send the user interaction data to the first one of the multiple different background OS services, then repeatedly retrieve the user interaction data from the notification cache and attempt to send this retrieved user interaction data with the first unique identifier of the first requested on-screen notification to the first one of the multiple different background OS services until the first one of the multiple different background OS services is available to successfully receive the user interaction data.

9. A method, comprising using at least one programmable integrated circuit of an information handling system to:

execute one or more notification user processes within different respective user application spaces on the information handling system;

execute a notification manager process in communication with each of the notification user processes and with multiple different background operating system (OS) services;

execute the notification manager process to:

receive a first notification request including first common notification data specifying a first desired common on-screen notification layout from a first one of the multiple different background OS services, the first common notification data designating at least one of the notification user processes and specifying a first requested on-screen notification for display to a user in the user application space of the designated notification user process, assign a first unique identifier to the first requested on-screen notification and provide the first unique identifier to the first one of the multiple different background OS services, find the at least one notification user process designated by the first common notification data, and send the received first common notification data with the first unique identifier of the first requested on-screen notification to the designated notification user process;

execute the designated notification user process to attempt to display the specified first requested on-screen notification to a user on a display device of the information handling system and in the user application space of the designated notification user process;

execute the notification manager process to:

receive a removal request for display of the first requested on-screen notification with the first unique identifier of the first requested on-screen notification from the first one of the multiple different background OS services, and send a removal request message with the first unique identifier of the first requested on-screen notification to the designated notification user process; and execute the designated notification user process to receive and respond to the removal request message by attempting to remove display of the first requested on-screen notification if it is currently displayed on the display device of the information handling system in the user application space of the designated notification user process.

10. The method of claim 9, further comprising using the at least one programmable integrated circuit of the information handling system to:

execute the designated notification user process to:

send notification removal success data with the first unique identifier of the first requested on-screen notification to the notification manager process if the attempt to remove display of the first requested on-screen notification succeeds, and send notification removal failure data with the first unique identifier of the first requested on-screen notification to the notification manager process if the attempt to remove display of the first requested on-screen notification fails; and execute the notification manager process to:

receive either of the notification removal success data or notification removal failure data with the first unique identifier of the first requested on-screen notification from the designated notification user process, store the received notification removal success data or notification removal failure data with the first unique identifier of the first requested on-screen notification in a notification cache maintained on at least one of non-volatile memory or volatile memory of the information handling system, attempt to send the received notification removal success data or notification removal failure data with the first unique identifier of the first requested on-screen notification to the first one of the multiple different background OS services, and upon failure of the attempt to send the received notification removal success data or notification removal failure data to the first one of the multiple different background OS services, then repeatedly retrieve the notification removal success data or notification removal failure data from the notification cache and attempt to send this retrieved notification removal success data or notification removal failure data with the first unique identifier of the first requested on-screen notification to the first one of the multiple different background OS services until the first one of the multiple different background OS services is available to successfully receive the notification removal success data or notification removal failure data.

11. The method of claim 1, further comprising using the at least one programmable integrated circuit of the local information handling system to:

execute the notification manager process to:

receive a removal request for the first requested on-screen notification with the first unique identifier of the first requested on-screen notification from the first one of the multiple different background OS services, send a removal request message with the first unique identifier of the first requested on-screen notification to the designated notification user process; and execute the designated notification user process to receive and respond to the removal request message by attempting to remove the first requested on-screen notification if it is currently displayed on the display device of the information handling system in the user application space of the designated notification user process.

12. The method of claim 1, where the first common notification data specifies a predefined on-screen notification layout of the designated notification user process;

where a designated custom popup plugin executes with the designated notification service, the designated custom popup plugin being programmed to display the first requested on-screen notification; where the first common notification data includes custom popup data that defines a data structure; and where the method further comprises using the at least one programmable integrated circuit of the local information handling system to:

execute the designated notification user process to provide the custom popup data to the designated custom popup plugin; and then execute the custom popup plugin to:

create data of a specified on-screen popup layout that is different from any predefined on-screen notification layout of the designated notification user process, provide the created data of the specified on-screen popup layout to the designated notification user process; and then execute the designated notification user process to display the specified on-screen popup layout to the user on the display device of the information handling system and in the user application space of the designated notification user process.

13. The method of claim 1, further comprising using at least one programmable integrated circuit of an information handling system to:

execute the notification manager process to:

receive a second notification request including second common notification data specifying a second desired common on-screen notification layout from a second one of the multiple different background OS services that is different from the first one of the multiple different background OS services, the second common notification data designating at least one of the notification user processes and specifying a second requested on-screen notification for display to a user in the user application space of the notification user process designated by the second common notification data, assign a second unique identifier to the second requested on-screen notification that is different from the first unique identifier, and provide the second unique identifier to the second one of the multiple different background OS services, find the notification user process designated by the second common notification data, and send the received second common notification data with the unique identifier of the second requested on-screen notification to the notification user process designated by the second common notification data; and execute the notification user process designated by the second common notification data to attempt to display the specified second requested on-screen notification to a user on a display device of the information handling system and in the user application space of the notification user process designated by the second common notification data;

where the first desired common on-screen notification layout is different from the second desired common on-screen layout.

14. An information handling system, comprising:

at least one programmable integrated circuit that is programmed to:

execute one or more notification user processes within different respective user application spaces on the information handling system;

execute a notification manager process in communication with each of the notification user processes and with multiple different background operating system (OS) services; and execute the notification manager process to:

receive a first notification request including first common notification data specifying a first desired common on-screen notification layout from a first one of the multiple different background OS services, the first common notification data designating at least one of the notification user processes and specifying a first requested on-screen notification for display to a user in the user application space of the designated notification user process, assign a first unique identifier to the first requested on-screen notification and provide the first unique identifier to the first one of the multiple different background OS services, find the at least one notification user process designated by the first common notification data, and send the received first common notification data with the first unique identifier of the first requested on-screen notification to the designated notification user process;

execute the designated notification user process to attempt to display the specified first requested on-screen notification to a user on a display device of the information handling system and in the user application space of the designated notification user process;

execute the notification manager process to:

receive a second notification request including second common notification data specifying a second desired common on-screen notification layout from a second one of the multiple different background OS services that is different from the first one of the multiple different background OS services, the second common notification data designating at least one of the notification user processes and specifying a second requested on-screen notification for display to a user in the user application space of the notification user process designated by the second common notification data, assign a second unique identifier to the second requested on-screen notification that is different from the first unique identifier, and provide the second unique identifier to the second one of the multiple different background OS services, find the notification user process designated by the second common notification data, and send the received second common notification data with the unique identifier of the second requested on-screen notification to the notification user process designated by the second common notification data; and execute the notification user process designated by the second common notification data to attempt to display the specified second requested on-screen notification to a user on a display device of the information handling system and in the user application space of the notification user process designated by the second common notification data;

where the first desired common on-screen notification layout is different from the second desired common on-screen layout.

15. The information handling system of claim 14, where the at least one programmable integrated circuit is programmed to:

execute the notification manager process to:

store the first common notification data with the first unique identifier of the first requested on-screen notification in a notification cache maintained on at least one of non-volatile memory or volatile memory of the information handling system, and then, if the designated notification user process is not initially available, later retrieve the first common notification data from the notification cache and send the retrieved first common notification data with the first unique identifier of the first requested on-screen notification to the designated notification user process when the designated notification user process is available to successfully receive the first common notification data.

16. The information handling system of claim 14, where the at least one programmable integrated circuit is programmed to:

execute the designated notification user process to:

send notification display success data with the first unique identifier of the first requested on-screen notification to the notification manager process if the attempt to display the first requested on-screen notification succeeds, and send notification display failure data with the first unique identifier of the first requested on-screen notification to the notification manager process if the attempt to display the first requested on-screen notification fails; and execute the notification manager process to:

receive either of the notification display success data or notification display failure data with the first unique identifier of the first requested on-screen notification from the designated notification user process, store the received notification display success data or notification display failure data with the first unique identifier of the first requested on-screen notification in a notification cache maintained on at least one of non-volatile memory or volatile memory of the information handling system, attempt to send the received notification display success data or notification display failure data with the first unique identifier of the first requested on-screen notification to the first one of the multiple different background OS services, and upon failure of the attempt to send the received notification display success data or notification display failure data to the first one of the multiple different background OS services, then repeatedly retrieve the notification display success data or notification display failure data from the notification cache and attempt to send this retrieved notification display success data or notification display failure data with the first unique identifier of the first requested on-screen notification to the first one of the multiple different background OS services until the first one of the multiple different background OS services is available to successfully receive the notification display success data or notification display failure data.

17. The information handling system of claim 14, where the at least one programmable integrated circuit is programmed to:

execute the designated notification user process to:

display the first requested on-screen notification to the user on the display device of the information handling system and in the user application space of the designated notification user process, the displayed on-screen notification including a user interface display configured to accept input from the user, receive user input provided from the user via the user interface display, create user interaction data that comprises data corresponding to the user input, and send the user interaction data with the first unique identifier of the first requested on-screen notification to the notification manager process: and execute the notification manager process to:

receive the user interaction data with the first unique identifier of the first requested on-screen notification from the designated notification user process, attempt to send the user interaction data with the first unique identifier of the first requested on-screen notification to the first one of the multiple different background OS services, store the user interaction data with the first unique identifier of the first requested on-screen notification in a notification cache maintained on at least one of non-volatile memory or volatile memory of the information handling system, and upon failure of the attempt to send the user interaction data to the first one of the multiple different background OS services, then repeatedly retrieve the user interaction data from the notification cache and attempt to send this retrieved user interaction data with the first unique identifier of the first requested on-screen notification to the first one of the multiple different background OS services until the first one of the multiple different background OS services is available to successfully receive the user interaction data.

18. The information handling system of claim 14, where the at least one programmable integrated circuit is programmed to:

execute the notification manager process to:

receive a removal request for the first requested on-screen notification with the first unique identifier of the first requested on-screen notification from the first one of the multiple different background OS services, send a removal request message with the first unique identifier of the first requested on-screen notification to the designated notification user process; and execute the designated notification user process to receive and respond to the removal request message by attempting to remove the first requested on-screen notification if it is currently displayed on the display device of the information handling system in the user application space of the designated notification user process.

19. The information handling system of claim 14, where the at least one programmable integrated circuit is programmed to:

execute the notification manager process to:

receive a notification update request including updated common notification data for the first requested on-screen notification with the first unique identifier of the first requested on-screen notification from the first one of the multiple different background OS services, and send the updated common notification data with the first unique identifier of the first requested on-screen notification to the designated notification user process; and execute the designated notification user process to receive and respond to the updated common notification data by attempting to update the first requested on-screen notification if it is currently displayed on the display device of the information handling system in the user application space of the designated notification user process.

20. The information handling system of claim 19, where the at least one programmable integrated circuit is programmed to:

execute the notification manager process to:

receive a removal request for the first requested on-screen notification with the first unique identifier of the first requested on-screen notification from the first one of the multiple different background OS services, send a removal request message with the first unique identifier of the first requested on-screen notification to the designated notification user process; and execute the designated notification user process to receive and respond to the removal request message by attempting to remove the first requested on-screen notification if it is currently displayed on the display device of the information handling system in the user application space of the designated notification user process.

21. The information handling system of claim 14, where the first common notification data specifies a predefined on-screen notification layout of the designated notification user process; where a designated custom popup plugin executes with the designated notification service, the designated custom popup plugin being programmed to display the first requested on-screen notification; where the first common notification data includes custom popup data that defines a data structure; and where the at least one programmable integrated circuit is programmed to:

execute the designated notification user process to provide the custom popup data to the designated custom popup plugin; and then execute the custom popup plugin to:

create data of a specified on-screen popup layout that is different from any predefined on-screen notification layout of the designated notification user process;

provide the created data of the specified on-screen popup layout to the designated notification user process; and then execute the designated notification user process to display the specified on-screen popup layout to the user on the display device of the information handling system and in the user application space of the designated notification user process.

* * * * *